(12) United States Patent
Kroll et al.

(10) Patent No.: US 11,493,822 B2
(45) Date of Patent: Nov. 8, 2022

(54) DIFFRACTIVE OPTICAL ELEMENT AND DISPLAY DEVICE

(71) Applicant: SEEREAL TECHNOLGIES S.A., Munsbach (LU)

(72) Inventors: Bo Kroll, London (GB); Norbert Leister, Dresden Sachsen (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 0 days.

(21) Appl. No.: 17/059,524

(22) PCT Filed: May 28, 2019

(86) PCT No.: PCT/EP2019/063797
§ 371 (c)(1),
(2) Date: Nov. 30, 2020

(87) PCT Pub. No.: WO2019/229051
PCT Pub. Date: Dec. 5, 2019

(65) Prior Publication Data
US 2021/0208471 A1    Jul. 8, 2021

(30) Foreign Application Priority Data
May 29, 2018    (EP) .................................... 18174838

(51) Int. Cl.
*G02F 1/29*    (2006.01)
*G02F 1/1343*    (2006.01)

(52) U.S. Cl.
CPC ........ *G02F 1/292* (2013.01); *G02F 1/134309* (2013.01); *G02F 1/291* (2021.01)

(58) Field of Classification Search
CPC ........... G02F 2201/30; G02F 2201/302; G02F 2201/305; G02F 2201/307; G02F 1/134309; G02F 1/291; G02F 1/292
See application file for complete search history.

(56) References Cited

U.S. PATENT DOCUMENTS 5,136,409 A * 8/1992 Fushimi ............ G02F 1/134309
349/141
5,943,159 A   8/1999 Zhu
(Continued)

FOREIGN PATENT DOCUMENTS

WO    2010149587 A2    12/2010

OTHER PUBLICATIONS

International Search Report, dated Aug. 19, 2019, and Written Opinion issued in the international application.

*Primary Examiner* — Mariam Qureshi
(74) *Attorney, Agent, or Firm* — Saul Ewing Arnstein & Lehr LLP

(57) ABSTRACT

The invention relates to a diffractive optical element which comprises a first substrate and a second substrate, between which a liquid crystal layer is provided. The diffractive optical element also has strip-shaped electrodes on the first substrate and strip-shaped electrodes on the second substrate. The electrodes on the first substrate are arranged at an angle of greater than 50° relative to the electrodes on the second substrate. Furthermore, the electrodes on the first substrate and the electrodes on the second substrate are controllable in such a way that a defined out-of-plane field can be produced in a respective overlapping area of the electrodes on the first substrate with the electrodes on the second substrate. The diffractive optical element can be used in a display device for displaying preferably three-dimensional scenes.

19 Claims, 11 Drawing Sheets

(56) References Cited

U.S. PATENT DOCUMENTS

| | | |
|---|---|---|
| 10,684,489 B2 | 6/2020 | Kroll et al. |
| 2012/0257127 A1* | 10/2012 | Miyazawa ............ H04N 13/305 349/15 |
| 2014/0055692 A1* | 2/2014 | Kroll ....................... G02F 1/292 349/15 |
| 2015/0277169 A1* | 10/2015 | Usukura ............... G02F 1/1337 359/9 |
| 2017/0075170 A1* | 3/2017 | Meng ................ G02F 1/136227 |

* cited by examiner

DIFFRACTIVE OPTICAL ELEMENT AND DISPLAY DEVICE

CROSS REFERENCE TO RELATED APPLICATIONS

This application claims the priority of PCT/EP2019/063797, filed on May 28, 2019, which claims priority to European Application No. EP 18174838.5, filed on May 28, 2018, the entire contents of each of which are incorporated fully herein by reference.

BACKGROUND OF THE INVENTION

The invention relates to a diffractive optical element for steering of light or for direction of light in a defined direction or for adaptation or adjustment of a field of view.

The invention also further relates to a display device for display of two-dimensional and/or three-dimensional objects or scenes having such a diffractive optical element.

There is a multitude of applications in which optical elements can be used for steering of light or for establishment of a field of view, for example in optical data transfer or in display devices or displays for representation of information in two-dimensional and/or three-dimensional form. In such display devices, especially in holographic display devices, diffractive optical elements are frequently used for controlled deflection of light. For example, a diffractive optical element may be used for observer tracking in a display device, in order to track light for generation of a preferably three-dimensional scene in the event of a change in position of an observer relative to the display device to a new position of the observer, or to direct it to the observer's new position.

In the case of holographic display devices having at least one virtual observer region that can also be referred to as virtual observer window, the scene or object generated in holographic form can be observed only when an eye of an observer of the scene is at the position of the virtual observer region, such that the observer can observe the scene represented on viewing through this virtual observer region. For this purpose, the observer must assume a fixed position relative to the display device. If, however, the observer moves to another position with respect to the display device, for the observer to be able to continue to observe the scene or information presented, the virtual observer region must be moved to the new position of the observer's eye.

A known option of observer tracking in display devices is the tracking or defined direction of the light by appropriate encoding of phase responses in addition to the encoding of a hologram in a spatial light modulation device provided for modulation of incident light and for generation of the reconstructed scene.

A further option of observer tracking involves the use of diffractive optical elements or devices, for example diffraction devices. Such diffractive optical elements or devices are designed to be controllable.

U.S. Pat. No. 8,860,896 B2, for example, discloses a phase modulator comprising a first substrate and a second substrate, an electrode arrangement and a liquid-crystal layer with liquid-crystal molecules. The first substrate is disposed opposite the second substrate, with the liquid-crystal layer disposed between the two substrates. The electrode arrangement has strip-shaped electrodes on only one substrate, while the other substrate has a planar electrode or no electrode. Such a phase modulator can also be used to achieve a variable diffraction grating by means of control of the in-plane electrodes on the one substrate. An in-plane field is generated here between each two strip-shaped electrodes on the same substrate. This makes it possible to create variable orientations of the liquid-crystal molecules of the liquid-crystal layer, such that variable grating periods can be generated. By writing a diffraction grating into the phase modulator with a particular grating period, it is thus possible to deflect light.

A phase deflector that uses an out-of-plane field between in each case a strip-shaped electrode on a first substrate and an electrode on a second substrate which is planar or likewise strip-shaped and runs parallel to the electrode of the first substrate is described in US 2012/0206667 A1. Here too, by writing a diffraction grating with a defined grating period into the phase deflector, deflection of light is achieved in a direction perpendicular to the alignment of the electrode lines. By variation in the grating period written, it is possible to alter the angle of light deflection.

US 2014/0055692 A1 describes the use of a diffraction device for observer tracking in a holographic display device. This diffraction device likewise comprises strip-shaped electrodes on at least one substrate. The deflection of light in a direction perpendicular to the alignment of the electrode lines is effected here too by writing a diffraction grating having a defined grating period into the diffraction device. The grating period may be varied here in order to alter the angle of light deflection. Various configurations of the diffraction device are described. In some configurations, an out-of-plane electrical field between in each case a strip-shaped electrode on a first substrate and an electrode on a second substrate which is planar or likewise strip-shaped and runs parallel to the electrode of the first substrate is used here.

In all the prior art elements or devices detailed here, in-plane fields or out-of-plane fields are used in combination with a respective liquid-crystal (LC) mode for which diffraction gratings can be adjusted with the aid of the respective fields.

Diffraction devices with generated in-plane fields may be based, for example, on an HAN (hybrid aligned nematic) mode or a CIPR (continuous in plane rotation) mode, as described in U.S. Pat. No. 8,860,896 B2.

Diffraction devices with generated out-of-plane fields may be based, for example, on an ECB (electrically controlled birefringence) mode, and they may also be based on liquid-crystal modes that use smectic liquid crystals, in which case the liquid-crystal molecules can perform in-plane rotation in the out-of-plane field.

In a holographic display device or a display, in general, observer tracking requires deflection of light both in horizontal and in vertical direction.

The prior art, for example as described in US 2014/0055692 A1, discloses using an arrangement composed of at least two diffraction devices for the purpose. The electrodes of a first diffraction device and the electrodes of a second diffraction device here are in an arrangement rotated essentially by 90 degrees relative to one another, or the two diffraction devices are provided with rotation relative to one another. For example, the first diffraction device in that case deflects the incident light in horizontal direction, with the second diffraction device deflecting the light in vertical direction. In order to perform observer tracking in depthwise direction (z direction) as well, at least two diffraction devices are used. A cylindrical lens function is written into each of the at least two diffraction devices, with the at least two crossed cylindrical lens functions approximating to a spherical lens. The diffraction devices may, for example, also be rotated or tilted by 45 degrees relative to a horizontal or horizontal line, such that the first diffraction device deflects the light by 45 degrees and the second diffraction device deflects light by 135 degrees.

Typically, a holographic display device comprises at least one light modulation device and at least two diffraction devices for deflection of light and hence for observer tracking.

Frequently, the light modulation device as well as the diffraction devices has ITO (indium tin oxide) electrodes on at least one substrate, the refractive index of which is distinctly different from the refractive index of the surrounding substrate, for example glass, and from the refractive index of the liquid-crystal layer. Reflection of light at the boundary surfaces between the ITO electrode and the substrate can, for example, impair the contrast of the scene represented. By absorption of light in the ITO electrodes, the brightness of the scene represented can be lowered additionally. In addition, these effects can be enhanced by an increasing number of ITO electrode layers in a display device.

The prior art includes further documents, for example US 2013/0222384 A1, which disclose alternative possible uses of diffraction devices. This includes use of diffraction devices in order, for example, to enable a large viewing angle or a large field of view in a head-mounted display (HMD). For such applications of diffraction devices too, pairs of one diffraction device for horizontal light deflection and one diffraction device for vertical light deflection or for horizontal and vertical focusing of light are typically used. For use of at least one diffraction device in a head-mounted display, it would especially also be advantageous to use at least one reflective diffraction device having, for example, reflective metal electrodes on a substrate or else transparent electrodes combined with a reflective layer disposed in some other way, either in the direction of passage of light through the diffraction device, upstream or downstream of the electrodes, for example either a metal layer or a dielectric mirror layer.

Frequently, however, pairs of diffraction devices are required for horizontal and vertical deflection of light at roughly the same location or position in a holographic display device. However, the use of reflective diffraction devices would require a minimum distance between the diffraction device for vertical deflection and/or vertical focusing of the light and the diffraction device for horizontal deflection and/or horizontal focusing of the light for modulated light to run successively and correctly through both diffraction devices in the light path.

SUMMARY OF THE INVENTION

It is therefore an object of the present invention to avoid the disadvantages of the prior art and to provide a possibility of permitting a reduction in the number of diffraction devices required in a display device.

It is a further object of the present invention to provide a possibility, for reflective diffraction devices, of permitting deflection of light in a first defined direction and deflection of light in a second defined direction roughly at the same position in the beam path of a display device.

The object is achieved in accordance with the invention by a diffractive optical element having the features of the claims.

The invention provides a diffractive optical element with which the above-mentioned disadvantages of the prior art can be avoided. The diffractive optical element comprises a first substrate and a second substrate, between which a liquid-crystal layer is provided. In addition, the diffractive optical element comprises strip-shaped electrodes on the first substrate and strip-shaped electrodes on the second substrate, where the electrodes on the first substrate are arranged at an angle of greater than 50° relative to the electrodes on the second substrate. The electrodes on the first substrate and the electrodes on the second substrate are controllable in such a way that a defined out-of-plane field is generatable in a respective overlap area of the electrodes on the first substrate with the electrodes on the second substrate.

For this purpose, the two substrates are arranged parallel to one another and each have strip-shaped electrodes. There may be variation in the number of electrodes, and also their width and pitch, such that the diffractive optical element, according to the use, may have a different number of electrodes. In a preferred embodiment of the invention, however, the electrode width and electrode pitch both within one substrate and on the first and second substrates are the same. However, it is also possible that the electrodes on a substrate have, for example, a defined distance from one another or the same width in one region and have a different distance from one another or a different width in another region on the same substrate. This may be true both of the first substrate and of the second substrate. However, the electrodes on the first substrate are arranged at an angle relative to the electrodes on the second substrate. The angle is advantageously >50°. Preferably, the electrodes of the two substrates are arranged perpendicular to one another or at an angle of about 90° to one another. The liquid-crystal layer embedded between the first substrate and the second substrate is controlled by an out-of-plane field which is generated in the overlap area or area of intersection between in each case one electrode on the first substrate and one electrode on the second substrate. A phase profile in the diffractive optical element is generated here by an out-of-plane orientation or an in-plane orientation of liquid-crystal molecules of the liquid-crystal layer, according to the liquid-crystal mode employed. The voltage applied to the electrodes of the first substrate and the second substrate generates an out-of-plane field in each case between the individual electrodes of the two substrates, such that the liquid-crystal molecules in the liquid-crystal layer rotate according to the liquid-crystal mode employed and are aligned correspondingly.

A diffractive optical element of such a design makes it possible not just to direct the light in just one defined direction, but also permits simultaneous deflection of the light in two different directions. This means that the diffractive optical element can deflect incident light, according to the control of the electrodes, in just one defined direction, but also, if required, can simultaneously deflect or direct the light in two different directions. It may thus advantageously be the case that the diffractive optical element is designed in such a way that incident light can be deflected in at least one direction.

Thus, in this way, a diffractive optical element is provided, which can deflect incident light both in a first direction and in a second direction provided at an angle relative to the first direction. The diffractive optical element may therefore serve as a diffraction device. For example, the diffractive optical element may be used as a diffraction device for deflection of light in a display device for representation of two-dimensional and/or three-dimensional information or scenes.

According to the invention, it is thus possible to use just a single diffractive optical element in the form of a diffraction device for simultaneous deflection of light in an essentially horizontal direction and in an essentially vertical direction in a display device. There is thus no longer any need for two individual diffraction devices, as envisaged in the prior art. A display device having such a diffractive optical element according to the invention that can be used as diffraction device can therefore be configured in a more compact and less expensive manner.

It is also possible to use the diffractive optical element to increase the size of the field of view in a display device, for example in a head-mounted display.

Further advantageous configurations and developments of the invention are apparent from the dependent claims.

In an advantageous embodiment of the invention, it may be provided that the diffractive optical element comprises at least one diffraction grating having a defined grating period.

Through the control of the electrodes by means of an applied defined voltage, it is possible to write a diffraction grating having a predetermined and defined grating period into the diffractive optical element, or generate it in the diffractive optical element. The grating period is variable. The grating period can be varied by altering the voltages applied to the electrodes in order to alter the angle of deflection of light. In this way, it is possible to generate a defined phase profile and hence achieve defined deflection of light by means of the diffractive optical element.

Advantageously, the diffractive optical element may be designed in such a way that a diffraction grating with a defined grating period is generatable by individual control of the electrodes on only one substrate for a deflection of light incident on the diffractive optical element in a predetermined direction.

It is thus possible to deflect light in one direction by writing a diffraction grating of a defined grating period into the diffractive optical element by means of individual and different control of the electrodes on the first substrate or on the second substrate. There are no different voltage values applied to the electrodes of the other substrate, but instead just one voltage value equal for all is applied. The direction in which the light is deflected depends on the arrangement of the electrodes on the respective substrate. In other words, if the electrodes on the substrate, it being of no importance here whether it is the first substrate or the second substrate, are arranged in horizontal direction, the light is deflected in vertical direction by the diffraction grating generated in the diffractive optical element. If, however, the electrodes are arranged in vertical direction on the substrate, light is deflected in horizontal direction by a diffraction grating generated. For deflection of light in horizontal direction by means of the diffractive optical element, it is thus necessary to consider the substrate, the electrodes of which are controlled by means of a control device, that are arranged vertically on the substrate. This could relate either to the first substrate or to the second substrate of the diffractive optical element. Deflection of light in just one direction may be sufficient, for example, when the diffractive optical element is used as diffraction device in a display device and tracking of the light is necessary only in one direction, for example when an observer of information or a scene presented has moved only horizontally or only vertically to another position, such that the observer can then still observe the scene presented.

If it is necessary, however, to deflect or to direct the light in two different directions, for example when an observer has moved to a new position both in horizontal direction and in vertical direction, in one configuration of the invention it can be provided that two diffraction gratings each with a defined grating period are generatable simultaneously by individual control of the electrodes on the first substrate and of the electrodes on the second substrate for a deflection of light incident on the diffractive optical element in two predetermined directions at an angle to one another.

Deflection of light additionally in a second direction at an angle to the first direction, preferably perpendicular direction, can take place by additionally writing or generating a diffraction grating having a particular or defined grating period into the same diffractive optical element by individual control of the electrodes on the other substrate. This simultaneously generates two diffraction gratings each with defined grating periods in the diffractive optical element. The electrodes of the first substrate and the electrodes of the second substrate may thus simultaneously be controlled by means of a control device, such that two diffraction gratings with two phase responses for deflection of light in two different directions are generated simultaneously. For example, a first direction of deflection of the light may be horizontal direction and a second direction of deflection of the light may be vertical direction, or vice versa. By writing different grating periods into the diffractive optical element on one substrate and on the other substrate, it is possible, for example, to achieve different deflection angles in horizontal direction and in vertical direction. The grating period written may also be varied within one substrate or within both substrates, for example from the edge toward the middle of the substrate, in order to write a lens function. For example, deflection in horizontal direction may be combined with focusing in vertical direction or vice versa, or else focusing of different strength in horizontal and vertical direction.

It may therefore advantageously be provided that the electrodes on the first substrate are in an essentially horizontal arrangement and the electrodes on the second substrate are in an essentially vertical arrangement, or that the electrodes on the first substrate are in an essentially vertical arrangement and the electrodes on the second substrate are in an essentially horizontal arrangement. In this way, the electrodes of the first substrate are arranged essentially at an angle of about 90° relative to the electrodes of the second substrate. The two directions of deflection of light are thus essentially perpendicular to one another. This corresponds essentially to vertical deflection of light and horizontal deflection of light. However, as already mentioned, it is also possible that the electrodes of the two substrates are arranged at an angle of less than 90° relative to one another. Advantageously, however, the angle should not be less than 50° since there is otherwise no longer any particular distinction in the directions of deflection of the light.

As alternative to this arrangement of the electrodes on the first substrate and of the electrodes on the second substrate, it may also be provided that the electrodes on the first substrate and the electrodes on the second substrate are each arranged at an angle to a horizontal line, where the electrodes of the first substrate are provided at an angle to the electrodes of the second substrate. The strip-shaped electrodes may also be arranged on the first substrate and on the second substrate alike with rotation or inclination at a defined angle relative to the horizontal or a general mathematical horizontal line. The angle at which the electrodes are arranged on the respective substrate may be within a range between 0° and 90°, preferably within a range between 30° and 60°. However, preference is given to an angle of about 45°. The electrodes of the first substrate are again arranged at an angle, for example an angle between 50° and 90°, relative to the electrodes of the second substrate. If, for example, the electrodes on the first substrate are arranged at an angle of about 45° to the horizontal line and the electrodes on the second substrate at an angle of about 135° to the horizontal line, the light would be deflected by about 45° in a first direction and by about 135° in a second direction. The arrangement of the electrodes on the two substrates can of course also be reversed, such that a first deflection of light would be at about 135° and a second deflection of light at 45°. Of course, the electrodes may also be arranged at other angles to the horizontal on the substrates.

It may also be provided in an advantageous manner that different electrical out-of-plane fields that repeat periodically are provided in the adjacent overlap areas of the electrodes of the first substrate with the electrodes of the second substrate.

This is the case when two diffraction gratings each with a defined grating period are to be generated simultaneously in the diffractive optical element. In this way, a defined out-of-plane field is achieved.

In the case of simultaneous generation of a first diffraction grating for deflection of light in a first defined direction and a second diffraction grating for deflection of light in a second defined direction, the distribution of flux lines of the electrical field generated between the electrodes of the first substrate and the electrodes of the second substrate in the liquid-crystal layer for generation of the first diffraction grating and distribution of flux lines of the electrical field for generation of the second diffraction grating can be different. This means that the change in the electrical field from one electrode to the next electrode may be set differently for the electrodes on the first substrate than for the electrodes on the second substrate.

More particularly, the electrodes on a substrate, for example the first substrate, may all be controlled with different voltage values, with the voltages repeating periodically with a defined grating period, relative to the first substrate with a first grating period. The electrodes on the other substrate, for example the second substrate, may likewise be controlled with different voltage values, in which case the voltages likewise repeat with a defined grating period, relative to the second substrate with a second grating period. The (first and second) grating period(s) may either be the same or different, meaning that the grating periods on the first substrate and on the second substrate can be set independently of one another.

Alternatively, the electrodes on a substrate may also be controlled with different voltage values in such a way that the voltages repeat periodically locally over a small range, for example over a few tens of electrodes, but that the grating period is varied over greater ranges, for example over a few thousand electrodes. For example, it would be possible to write the period of 4 in 10 instances over 40 electrodes and then to write the period of 5 in 10 instances over the next 50 electrodes.

This can be used, for example, in order to write diffractive structures such as lens functions, in which case the invention is not to be restricted to simple lens functions but includes any structures. It is again possible, on one substrate independently, to alter the grating period intended in a defined direction with the location. It is possible to alter the other grating period intended on the other substrate in another, for example perpendicular, defined direction with the location. For example, it is possible to write an equal grating period over the horizontal extent of the substrate in horizontal direction on the first substrate, in order to deflect light at a given angle in horizontal direction. On the second substrate, however, it is possible to write a grating period that varies over the vertical extent of the substrate in vertical direction.

Apart from lens functions, it is also possible, for example, to write different phase functions for correction of aberration respectively on one substrate and on the other substrate.

In a further configuration of the invention, it may be provided that a single diffraction grating is generated in the diffractive optical element by controlling the electrodes on one substrate with equal voltage values and controlling the electrodes on the other substrate with respectively different, periodically repeating voltage values by a control device. For example, the electrodes on a substrate, for example the first substrate, may all be controlled with a voltage value of 0 volts, while the electrodes on the other substrate, for example the second substrate, are each controlled with different voltage values, for example with 0 volts, 2.66 volts and 5.33 volts. These applied voltages repeat periodically according to the grating period required in the diffraction grating to be generated in the diffractive optical element. In this way, it is possible to realize and achieve deflection of light in just one defined direction by means of the diffractive optical element according to the invention.

Both in the case of generation of just one diffraction grating and in the case of generation of two different diffraction gratings in the diffractive optical element, the grating period is of course not limited to the simple example used here with just 3 electrodes, but may especially also have longer grating periods, for example of 20 or 100 electrodes, and have more complex voltage curves.

According to the invention, a liquid-crystal mode is provided with which by an out-of-plane field at least one diffraction grating with a defined grating period is generatable.

The invention uses liquid-crystal modes for which, by means of an out-of-plane electrical field, it is possible to write a periodic diffraction structure for generation of a diffraction grating into the diffractive optical element.

Suitable liquid-crystal modes may, for example, be ECB mode (electrically controlled birefringence mode), ULH mode (uniformly lying helix mode) or else VA mode (vertical alignment mode). In other words, a liquid-crystal mode provided advantageously may be an ECB mode, a ULH mode or a VA mode.

In one embodiment of the invention, it is possible to use an ECB mode in which the optical axes of the liquid crystal molecules of the liquid-crystal layer also rotate out-of-plane in the out-of-plane field. In this embodiment of the invention, it is possible with preference to use linear-polarized light.

In another embodiment of the invention, it is possible to use liquid-crystal molecules in the liquid-crystal layer that have essentially in-plane rotation of their optical axis in the out-of-plane field. These may be smectic liquid crystals or else cholesteric liquid crystals. For example, cholesteric liquid crystals are used in ULH mode. In the case of use of smectic or cholesteric liquid crystals and the corresponding liquid-crystal modes, it is possible with preference to use circular-polarized light.

In a further configuration of the invention, it may advantageously be provided that a phase modulation of the light in the liquid-crystal layer of $\geq 2\pi$, preferably of $\geq 4\pi$, is realizable.

In the liquid-crystal layer, a range of phase modulation of the light of greater than $2\pi$ should advantageously be provided. This means that, in the case of application of an electrical field, through choice of the field strength, the phase can be set between a minimum value and a maximum value, and the difference between the maximum value and the minimum value is more than $2\pi$.

In a particularly preferred embodiment, the liquid-crystal layer is to be used to adjust a range of phase modulation of the light of at least $4\pi$, i.e. $\geq 4\pi$. This applies to diffractive optical elements in transmissive form. In order to achieve phase modulation of $\geq 4\pi$ within the liquid-crystal layer, the thickness of the liquid-crystal layer may be adjusted appropriately, meaning that the liquid-crystal layer then has a greater thickness than, for example, a liquid-crystal layer of a diffractive optical element in reflective form.

In the case of a diffractive optical element in reflective form, this value for maximum phase modulation of light of $\geq 4\pi$ is to apply to twice the path length of light through the liquid-crystal layer, i.e. to the distance traveled by the light through and back. For many liquid-crystal modes, passage of the light through the liquid-crystal layer twice also leads to doubling of the phase modulation. For an ECB mode, for example, a phase modulation of $\geq 2\pi$ in a single pass of the light through the liquid-crystal layer would correspond to a phase modulation of $\geq 4\pi$ in a back-and-forth pass.

Further, it may also advantageously be provided that a range of phase modulation is selectable that has a linear characteristic of the phase of light depending on the voltage applied to the electrodes of at least one substrate by means of at least one control device.

According to the invention, a range of phase modulation in the liquid-crystal layer that has approximately a linear correlation of phase with the voltage applied to the electrodes of the substrates and consequently with the out-of-plane field applied is utilized.

For an ECB mode used in a liquid-crystal layer, for example, the result is frequently an approximately S-shaped curve for the dependence of the phase modulation on the voltage applied to an electrode arrangement. In the case of very small and in the case of very large phase values alike, in accordance with the S-shaped curve, the dependence of the phase on the voltage applied varies significantly from the desired linear behavior. For moderate phase values, the change in the phase value with the voltage applied, however, is roughly linear. According to the invention, only the linear section of a curve is utilized for the dependence of the phase modulation on the voltage applied to the electrodes of the substrates. The maximum phase modulation of the light in the liquid-crystal layer is preferably chosen to be sufficiently large, e.g. $\geq 5\pi$, that the portion of the phase modulation corresponding to the region with linear behavior of the phase of the light with respect to the voltage applied to the electrodes of the substrate also encompasses a phase modulation range of about $4\pi$.

In one inventive configuration of the invention, the diffractive optical element is designed to be reflective. In a preferred configuration of the invention, the diffractive optical element may be in reflective form and have a liquid-crystal mode in which liquid-crystal molecules of the liquid-crystal layer in the out-of-plane field perform in-plane rotation of their optical axes. For this purpose, the liquid-crystal layer may have smectic liquid crystals, for example, or the liquid-crystal mode used may be ULH mode.

According to the invention, the diffractive optical element may be designed to be transmissive or reflective.

The object of the invention is also achieved by a display device having the features of claim 17.

The invention provides a display device for displaying two-dimensional and/or three-dimensional objects or scenes. The display device comprises an illumination device, at least one spatial light modulation device and at least one diffractive optical element according to the invention.

The display device may especially be a holographic display device with which preferably three-dimensional scenes or objects are reconstructed in a holographic manner and presented to at least one observer. The illumination device, which may comprise at least one laser or a light-emitting diode (LED) as at least one light source, emits at least approximately coherent light which is correspondingly directed onto the at least one spatial light modulation device. The spatial light modulation device modulates this light with the information to be correspondingly represented and, with the aid of an optical system, reconstructs the scene to be presented or the object. The diffractive optical element according to the invention may be used and arranged in the display device in such a way that it acts as a diffraction device and deflects the light incident thereon in at least one defined direction or generates an enlarged field of view. This diffractive optical element may, in one embodiment, thus be provided as a tracking element in the display device and may then be correspondingly controlled as described in the display device in the event of a change in position of an observer, such that the light is directed by the diffractive optical element to a new position of the observer relative to the display device. In order to establish or to detect the position of the observer, the display device may comprise a position detection system, for example a camera. In this way, the observer can also observe the scene presented at their new position.

In another embodiment, the diffractive optical element may be used for a segmented multiple image of a light modulation device in order, for example, to generate an enlarged field of view. In a further embodiment, the diffractive optical element may be used, for example, in a display device that generates an image of a light modulation device, for example in a head-up display or a head-mounted display, in order to move the depth plane of the image of the light modulation device.

A display device may also comprise, for example, two diffractive optical elements according to the invention, one for observer tracking in lateral direction and in depth direction (z direction), and a further diffractive optical element for a segmented multiple image of a light modulation device and movement of the depth plane of the segments of the multiple image.

In an advantageous configuration of the invention, it may be provided that the illumination device is provided for emission of polarized light.

It is possible here to use linear-polarized light or else circular-polarized light. The use of linear-polarized light is particularly advantageous in conjunction with ECB mode as liquid-crystal mode, in which the optical axes of the liquid-crystal molecules also rotate out-of-plane in the out-of-plane field.

Preferably circular-polarized light may be employed when the liquid-crystal mode is a ULH mode, i.e. in the case of cholesteric liquid crystals in the liquid-crystal layer, or in the case of use of smectic liquid crystals in the liquid-crystal layer. These liquid crystals perform essentially in-plane rotation of their optical axes in an out-of-plane field generated.

According to the invention, control of the electrodes on the first substrate and/or of the electrodes on the second substrate may be accomplished by provision of at least one control device.

The at least one control device may be designed such that it can apply a required voltage to the electrodes of the first substrate and to the electrodes of the second substrate, such that an out-of-plane (electrical) field propagates or is generated between the two substrates in the liquid-crystal layer.

It would also be possible, in another configuration, to control the electrodes of the first substrate with a control device and the electrodes of the second substrate with a further control device.

There are now various ways for advantageously configuring the teaching of the present invention and/or combining the described exemplary embodiments or configurations with one another. In this regard, on the one hand, reference is to be made to the patent claims dependent on the independent patent claims, and on the other hand to the following explanation of the preferred exemplary embodiments of the invention that follows with reference to the drawings, in which preferred configurations of the teaching are also generally explained. The invention is explained by way of principle with reference to the exemplary embodiments described, but without any intention to restrict it thereto.

BRIEF DESCRIPTION OF THE DRAWINGS

The figures show.

It should be briefly mentioned that identical elements/parts/components may also have the same reference numerals in the figures.

DETAILED DESCRIPTION OF THE INVENTION

Figure 1:
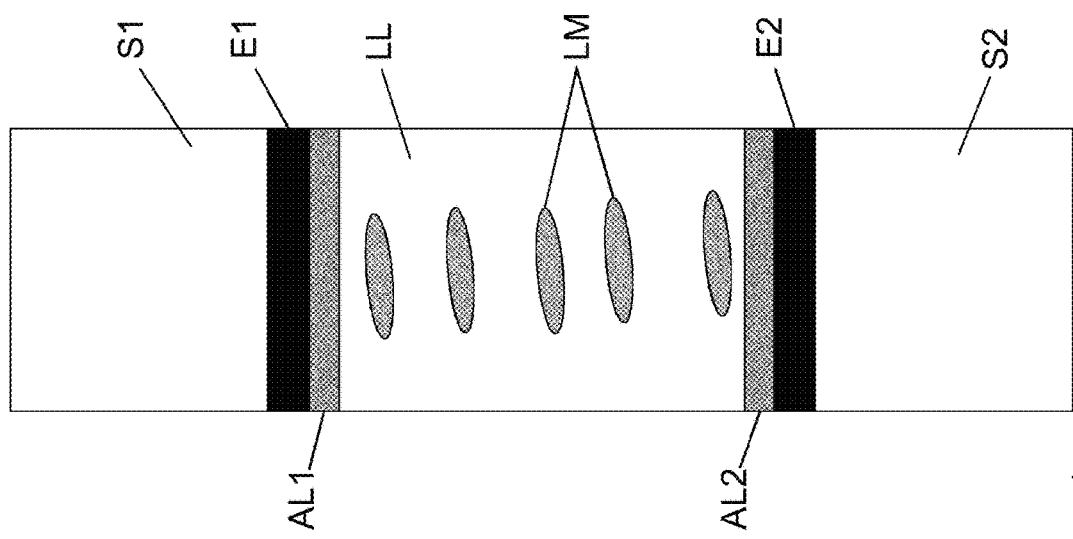
FIG. 1: a schematic diagram of a liquid-crystal mode, especially an ECB mode, in a liquid-crystal layer according to the prior art.
Figure 1:
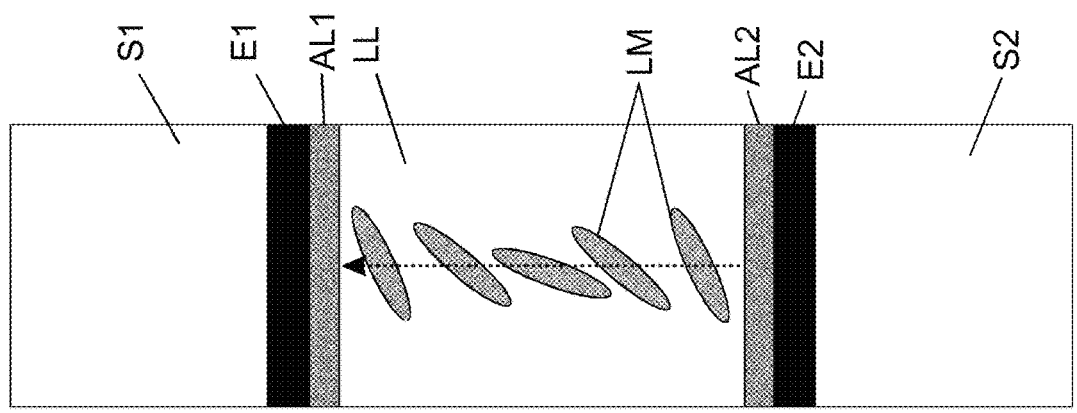

In FIG. 1 the liquid crystal mode ECB as known from the prior art is to be briefly described. By way of explanation of ECB mode, and optical element is shown, to which no voltage is applied in the left-hand diagram a) of FIG. 1, whereas there is a voltage across the optical element in diagram b), on the right. The optical element according to FIG. 1 comprises two substrates S1 and S2 opposite and parallel to one another. The two substrates S1 and S2 each comprise a planar electrode E1, E2. A liquid-crystal layer LL having liquid-crystal molecules LM is provided between the two substrates S1 and S2. Disposed between the electrode E1 and E2 and the liquid-crystal layer LL in each case is an alignment layer AL1, AL2, which is provided for pre-alignment of the liquid-crystal molecules LM. Alignment layers are known from the prior art, and so there will be no further discussion thereof here, especially since a detailed description of this alignment layer does not contribute any essential features to the present invention. In the case of ECB mode, the liquid-crystal molecules, in the absence of electrical field, on account of the alignment layer AL1, AL2, are aligned essentially parallel to the substrate surface, as shown in diagram a) of FIG. 1. In the case of ECB mode, the alignment on the two substrates S1 and S2 is set anti-parallel relative to one another.

If, according to diagram b) of FIG. 1, different voltages Va, Vb are applied to the electrodes E1 and E2 of the substrates S1 and S2, an electrical out-of-plane field is established between the electrodes E1 and E2. This out-of-plane field is indicated by the dotted arrow. The out-of-plane field aligns the liquid-crystal molecules LM vertically. In other words, the out-of-plane field forces the liquid-crystal molecules LM from their parallel alignment relative to the surface of the substrate S1, S2 into an alignment perpendicular to the surface of the substrate. However, the degree of vertical alignment of the liquid-crystal molecules LM achieved differs with the strength of the field applied or with the voltage value applied to the electrodes E1 and E2.

According to the polarization state of the light incident on the optical element, this alignment of the liquid-crystal molecules LM in the electrical field leads either to polarization rotation of the light that can be used to modulate the amplitude of the light or to phase modulation. Phase modulation of the light may especially be undertaken when linear-polarized light is being used, the polarization direction of which is parallel to the orientation of liquid-crystal molecules generated by the alignment layer.

Figure 2:
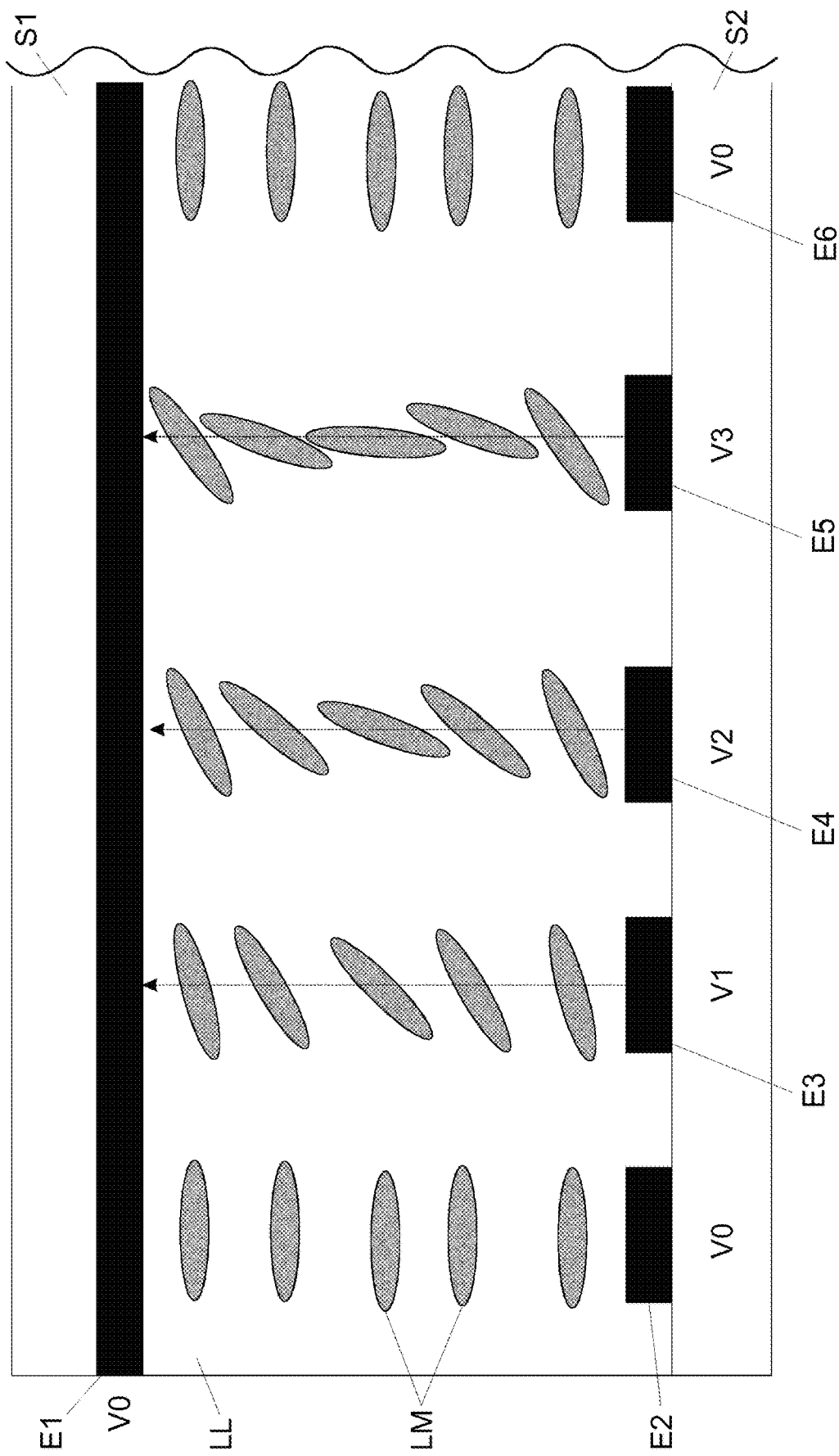
FIG. 2: a schematic diagram of a diffraction device according to the prior art that uses ECB mode.

FIG. 2 shows the principle, in a side view, of the use of ECB mode in a diffraction device according to prior art. The diffraction device comprises two substrates S1 and S2, between which a liquid-crystal layer LL is disposed. The substrate S1 here too comprises a planar electrode E1, while multiple individual linear electrodes E2 to $E_N$ are provided on the substrate S2. These electrodes E2 to $E_N$ are arranged parallel to one another on the substrate S2. The two substrates S1 and S2 here comprises alignment layers (not shown) that serve for pre-alignment of the liquid-crystal molecules LM in the liquid-crystal layer LL. The liquid-crystal molecules LM are aligned parallel to the substrates S1 and S2 here by means of the alignment layers and in perpendicular alignment to the individual electrodes E2, . . . , $E_N$ of the substrate S2.

By application of different voltages V0, V1, V2, V3 to the individual linear electrodes E2, E3, E4, E5, E6, . . . , $E_N$ on the substrate S2 and by application of a voltage V0 to the planar electrode E1 on the substrate S1, different electrical fields between the individual electrodes E2, E3, E4, . . . , $E_N$ and the planar electrode E1 are generated in each case, which lead to different intensities of alignment of the liquid-crystal molecules LM along the arrow shown, i.e. vertically here. As apparent in FIG. 2, the voltages V0, V1, V2 and V3 applied repeat in a periodic manner. In this way, it is possible to set different phase modulation for each electrode $E2, \ldots, E_N$.

Figure 3:
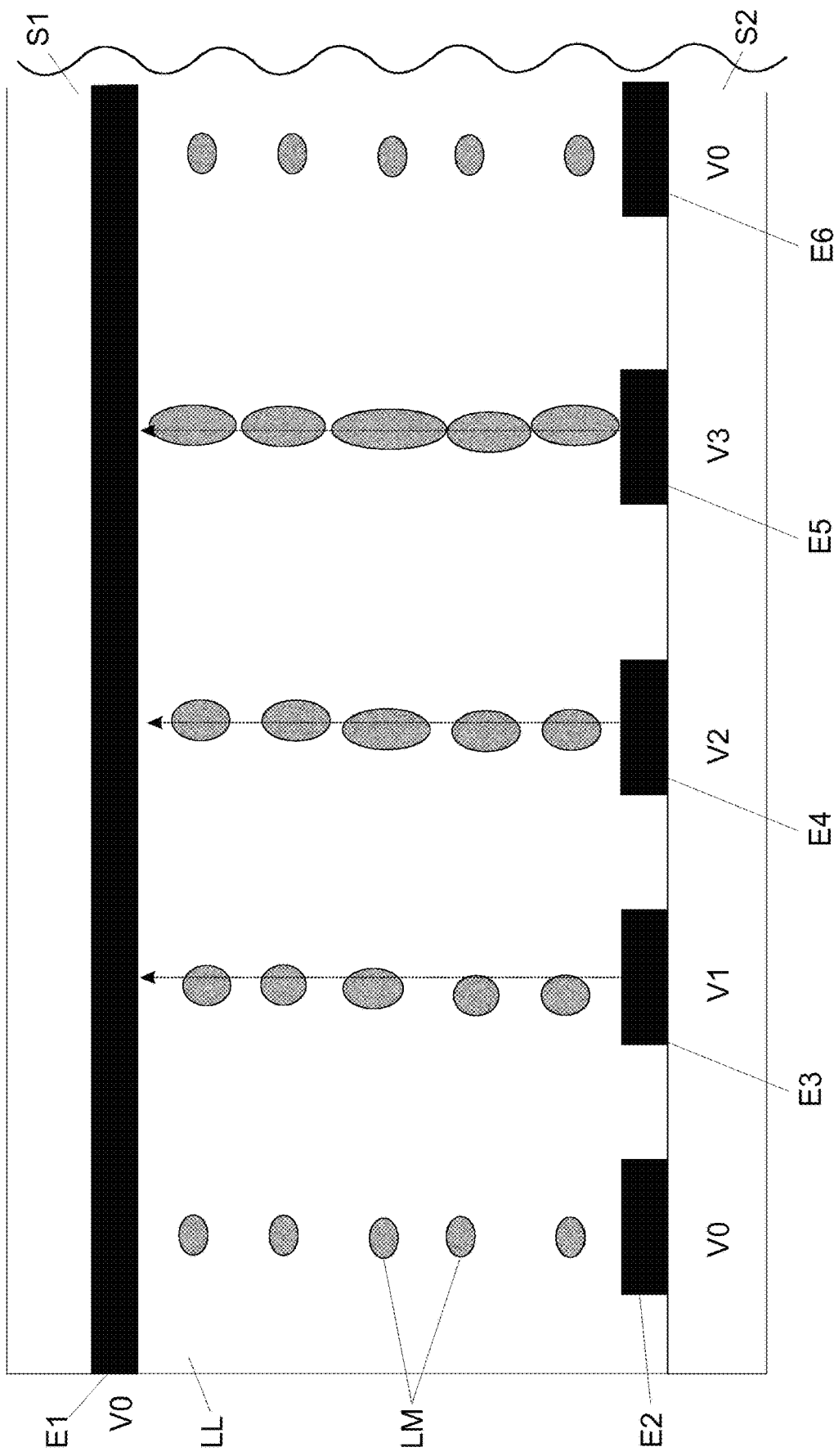
FIG. 3: a schematic diagram of a further diffraction device according to the prior art.

FIG. 3 shows a side view of a prior art diffraction device according to FIG. 2, except that the liquid-crystal molecules LM, on account of the alignment layers (not shown here either), are likewise aligned parallel to the substrates S1 and S2, but now parallel to the individual linear electrodes E2, E3, E4, E5, E6, ..., $E_N$ on the substrate S2. FIG. 3 thus shows the projection onto the short axis of the liquid-crystal molecules LM. Here too, in accordance with the diffraction device described in FIG. 2, different electrical fields are generated between the planar electrode E1 and the individual electrodes E2, ..., $E_N$, which lead to corresponding alignment of the liquid-crystal molecules LM.

An exemplary embodiment according to the invention by comparison with the prior art is initially explained in detail hereinafter. Here too, the comparison is to be made using an ECB mode.

Figure 4:
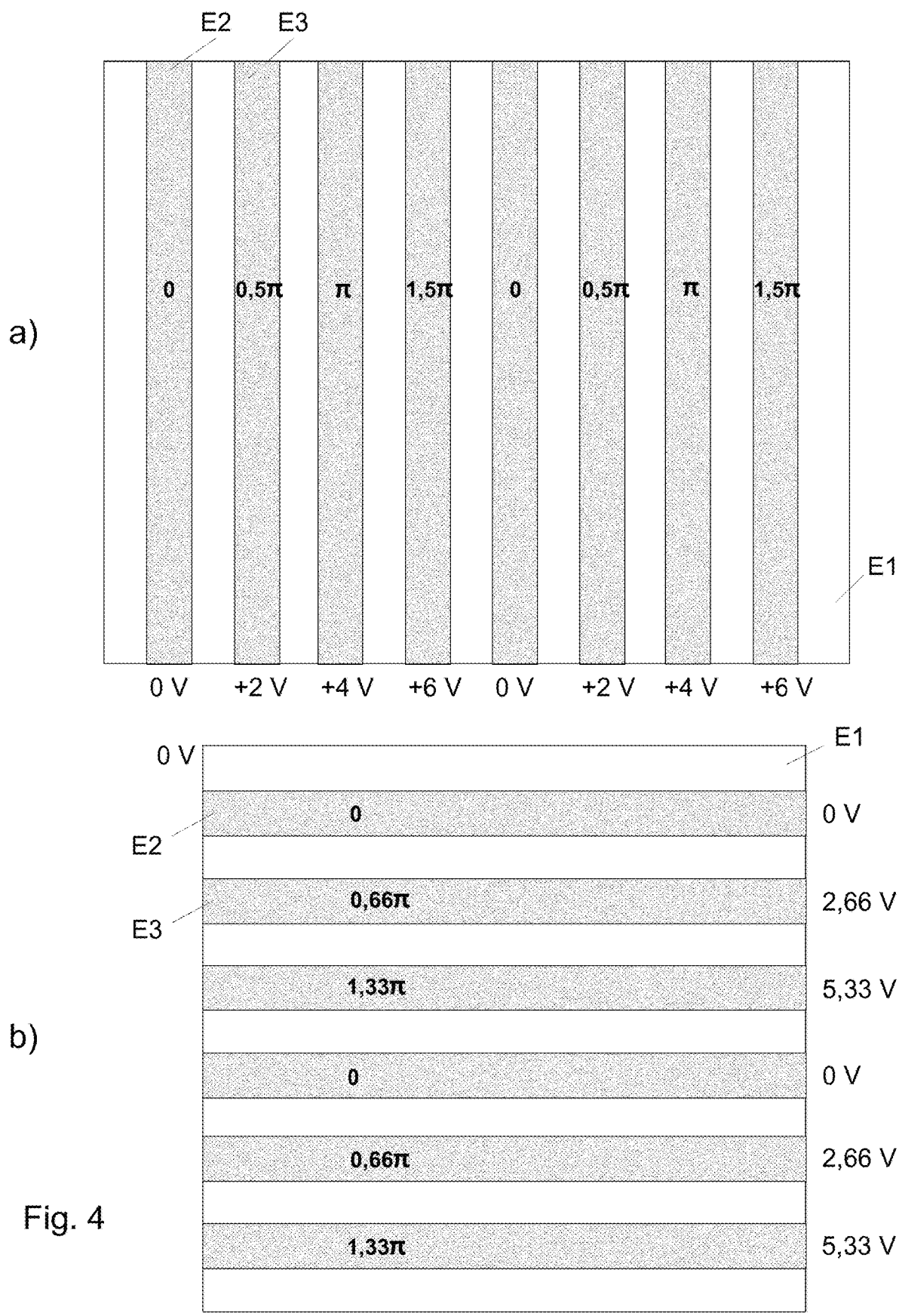
FIG. 4: a diagram showing the principle of two diffraction devices according to prior art with use of ECB mode for deflection of light, in top view.

FIG. 4 shows, according to the prior art, the use of two diffraction devices in a top view as usable, for example, in US 2014/0055692 A1 in a display device as tracking devices for the light. For a simplifying explanation, a linear dependence of the phase established on the voltage applied to an electrode arrangement of the diffraction devices is assumed.

A first diffraction device according to diagram a) of FIG. 4 comprises electrodes E2, E3, ..., $E_N$ in strip or linear form and in a vertical arrangement on a first substrate, and a planar electrode E1 on a second substrate, which, like the first substrate here too, is not shown for reasons of clarity. The two substrates S1 and S2 are arranged in parallel and with maximum congruence relative to one another. Due to the representation of the diffraction device in a top view and for reasons of clarity without the representation of the substrates S1 and S2 and of any layers present, for example alignment layers, or of a liquid-crystal layer, the electrodes E2, E3, ..., $E_N$ and the planar electrode E1 lie one on top of another, such that only the electrode arrangement is to be considered here. A diffraction grating having a grating period of four electrodes is written into this diffraction device and generated. For this purpose, by applying suitable voltages to the strip-shaped electrodes E2, E3, ..., $E_N$ and a suitable voltage to the planar electrode E1 between each of the strip-shaped electrodes E2, E3, ..., $E_N$ and the planar electrode E1, electrical fields are generated, and periodically repeating phase values 0; $0.5\pi$; $\pi$ and $1.5\pi$ are written into the diffraction device. In this exemplary embodiment, this is done by applying a voltage of 0 volts (0 V) to the planar electrode E1 and by applying the periodically repeating voltages of 0 volts (0 V), 2 volts (2 V), 4 volts (4 V) and 6 volts (6 V) to the strip-shaped electrodes E2, E3, ..., $E_N$.

In the case of use of an ECB mode, the phase of the liquid-crystal molecules adjusted in a liquid-crystal layer is dependent not on the sign but on the magnitude of the voltage applied to the electrodes present. Therefore, in this exemplary embodiment, it would instead also be possible to apply voltages of 0 volts, −2 volts, −4 volts and −6 volts in order to adjust or generate the same diffraction grating with a grating period of four electrodes.

Diagram b) of FIG. 4 shows a second diffraction device which, in contrast to the first diffraction device according to diagram a) of FIG. 4, comprises electrodes E2, E3, ..., EN in strip or linear form and in horizontal arrangement on a first substrate and a planar electrode E1 on a second substrate. Here too, for reasons of clarity, only the electrode arrangement is to be considered. In diagram b), a diffraction grating with a grating period of three electrodes is written into the diffraction device and generated. For this purpose, by application of suitable voltages between the strip-shaped electrodes E2, E3, ..., $E_N$ and planar electrode E1, periodically repeating phase values 0, $0.66\pi$ and $1.33\pi$ are written here. This is effected by applying appropriate voltages between the planar electrode E1 with a voltage of 0 volts (0 V) and the strip-shaped electrodes E2, E3, E4, ..., $E_N$ with voltages of 0 volts (0 V), 2.66 volts (2.66 V) and 5.33 volts (5.33 V), in order to adjust these phase values.

By means of the first diffraction device according to diagram a), light is deflected in horizontal direction. By means of the second diffraction device according to diagram b), light is deflected in vertical direction.

Figure 5:
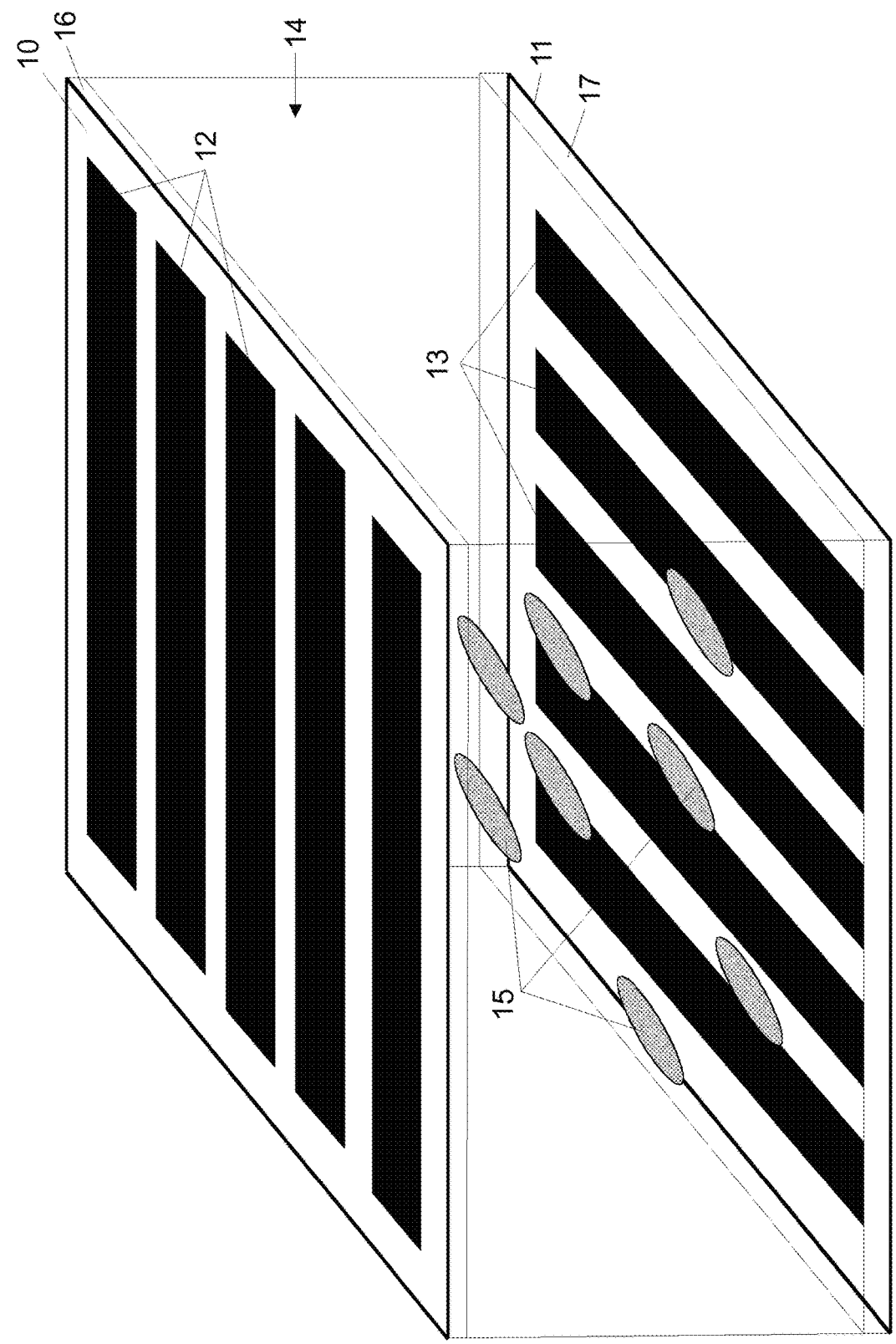
FIG. 5: a diagram showing the principle of a diffractive optical element according to the invention without application of an electrical field, in perspective view.

FIG. 5 shows, in perspective view, a diffractive optical element according to the invention. The diffractive optical element comprises a first substrate 10 and a second substrate 11. The first substrate 10 comprises horizontal electrodes 12 in strip or linear form, while the second substrate 11 comprises vertical electrodes 13 in strip or linear form. It is of course also possible for the first substrate 10 to have strip-shaped electrodes that are aligned and arranged in vertical direction, and for the second substrate to have strip-shaped electrodes that are aligned and arranged in horizontal direction, or for the electrodes 12 and 13 each to also be arranged at an angle to a horizontal line on their substrates. The strip-shaped electrodes 12 on the first substrate, and also the strip-shaped electrodes 13 on the second substrate 11, are each arranged parallel to one another. In this way, a diffractive optical element is created that has strip-shaped electrodes 12, 13 on the two substrates 10, 11, which are additionally crossed with respect to one another. In other words, the electrodes 12 on the first substrate 10 are arranged at an angle, about 90° here, to the electrodes of the second substrate 11, such that the electrodes 12 and 13 form mutually crossed electrode arrangements. Between the two substrates 10 and 11 that are aligned and arranged parallel to one another, a liquid-crystal layer 14 having liquid-crystal molecules 15 is provided. Alignment layers 16 and 17 that achieve pre-alignment of the liquid-crystal molecules 15 in the liquid-crystal layer 14 have been applied to the two substrates 10 and 11. The alignment layers 16 and 17 have been applied here to the substrates 10 and 11, for example by means of rubbing, in such a way that the liquid-crystal molecules 15 are pre-aligned parallel to the second substrate 11 and parallel to the electrodes 13 provided thereon and parallel to the first substrate 10 but perpendicular to the electrodes 12 disposed thereon.

The diffractive optical element according to FIG. 5 is shown in the condition in which there is no voltage across the electrodes 12 and 13 of the first substrate 10 and of the second substrate 11, such that no electrical field can propagate within the liquid-crystal layer 14.

By applying periodic voltages to the electrodes 12 of the first substrate 10 and to the electrodes 13 of the second substrate 11, it is possible to write and generate two diffraction gratings each with a defined grating period into the diffractive optical element. The grating period is variably adjustable independently for the two diffraction gratings. Generation of two diffraction gratings in the diffractive optical element is shown in perspective view in FIG. 6, using the same diffractive optical element as shown in FIG. 5. Since, in FIG. 5 and FIG. 6, the electrodes 12 of the first substrate 10 are arranged at an angle of about 90° to the electrodes 13 of the second substrate 11, and the electrodes 12 are aligned in horizontal direction and the electrodes 13 are aligned in vertical direction, a diffraction grating in horizontal form with a defined grating period and a diffraction grating in vertical form with a defined grating period are written into the diffractive optical element and generated. The two diffraction gratings are generated simultaneously. In this way, it is possible to use just a single optical element to deflect the light simultaneously in two different directions at an angle. However, the electrodes 12 and 13 may also be disposed at an angle to a horizontal line on the substrates 10 and 11. For example, it would be possible to arrange the electrodes 12 at an angle of about 45° to the horizontal line and the electrodes 13 at an angle of about 135° to the horizontal line on the substrates 10 and 11. It is also possible that the electrodes 12 and 13 are not arranged exactly perpendicular to one another, i.e. at an angle of 90°. It would thus also be possible for the electrodes 12 and 13 to be arranged at an angle of about 80°, for example, relative to one another, where the angle should preferably be greater than 50°.

Figure 6:
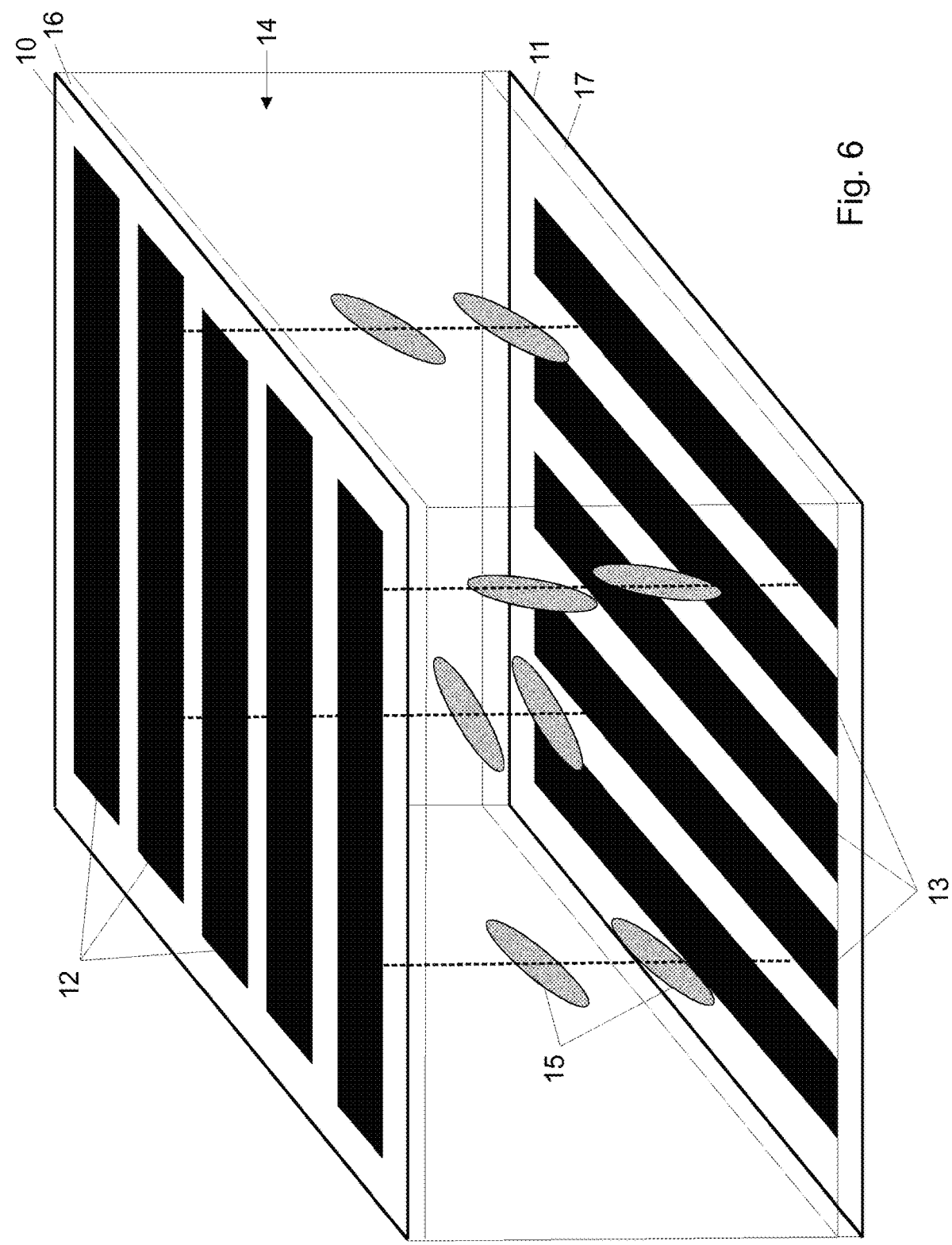
FIG. 6: a schematic diagram of the diffractive optical element according to the invention according to FIG. 5 in the presence of an electrical field, in perspective view.

For reasons of clarity, FIG. 6 shows the applying of an electrical field only for two electrodes 12 of the first substrate 10 and for two electrodes 13 of the second substrate 11. For this purpose, voltages Vu1 and Vu2 are applied to the electrodes 13 of the second substrate 11, and voltages Vo1 and Vo2 to the electrodes 12 of the first substrate, by means of a control device (not shown). The voltage Vu1 differs here in its value from the voltage Vu2, with the voltage Vo1 differing in its value from the voltage Vo2. In the overlap area or in the range of intersection in each case of an upper and lower electrode, a defined electrical field is found here, e.g. Vo1-Vu1 or Vo1-Vu2 or Vo2-Vu1 or Vo2-Vu2. The higher the voltage value applied to an electrode 12, 13, the greater the mobility of liquid-crystal molecules in the electrical field, i.e. the greater the out-of-plane rotation of the optical axis of the liquid-crystal molecules. As apparent in FIG. 6, there is a voltage Vu2 applied to an electrode 13 of the second substrate 11 that has a higher voltage value than the voltage value Vu1 applied to another electrode 13 of the second substrate 11. Thus, an out-of-plane field forms between the electrodes 12 and 13, and the liquid-crystal molecules 15, in the case of application of a high voltage Vu2, perform greater out-of-plane rotation of their optical axes than liquid-crystal molecules 15 at a low applied voltage value Vu1. This means that, in the case of a high voltage value Vu2 applied to an electrode 13, the optical axes of the liquid-crystal molecules 15 in this region move from a parallel pre-alignment according to FIG. 5 into a direction nearly perpendicular to the second substrate 11, in order to generate a required diffraction grating. The liquid-crystal molecules 15 in the region of the electrodes 13 to which a low or lower voltage Vu1 are applied likewise perform out-of-plane rotation, but with a lower rotation, such that the optical axis of the liquid-crystal molecules 15 is not perpendicular to the second substrate 11, but rather at a defined angle dependent on the voltage value applied.

The electrical out-of-plane field generated between the individual electrodes 12 and 13 thus leads in each case to a different degree of out-of-plane alignment, here in FIG. 6 a greater degree of parallel or of perpendicular alignment, of the liquid-crystal molecules 15 relative to the substrates 10 and 11. In this way, the greater degree of parallel or of perpendicular alignment of the liquid-crystal molecules 15 relative to the substrates 10 and 11 shown and hence the phase modulation of the light incident on the diffractive optical element may be varied from electrode to electrode either in vertical direction or in horizontal direction.

Figure 7:
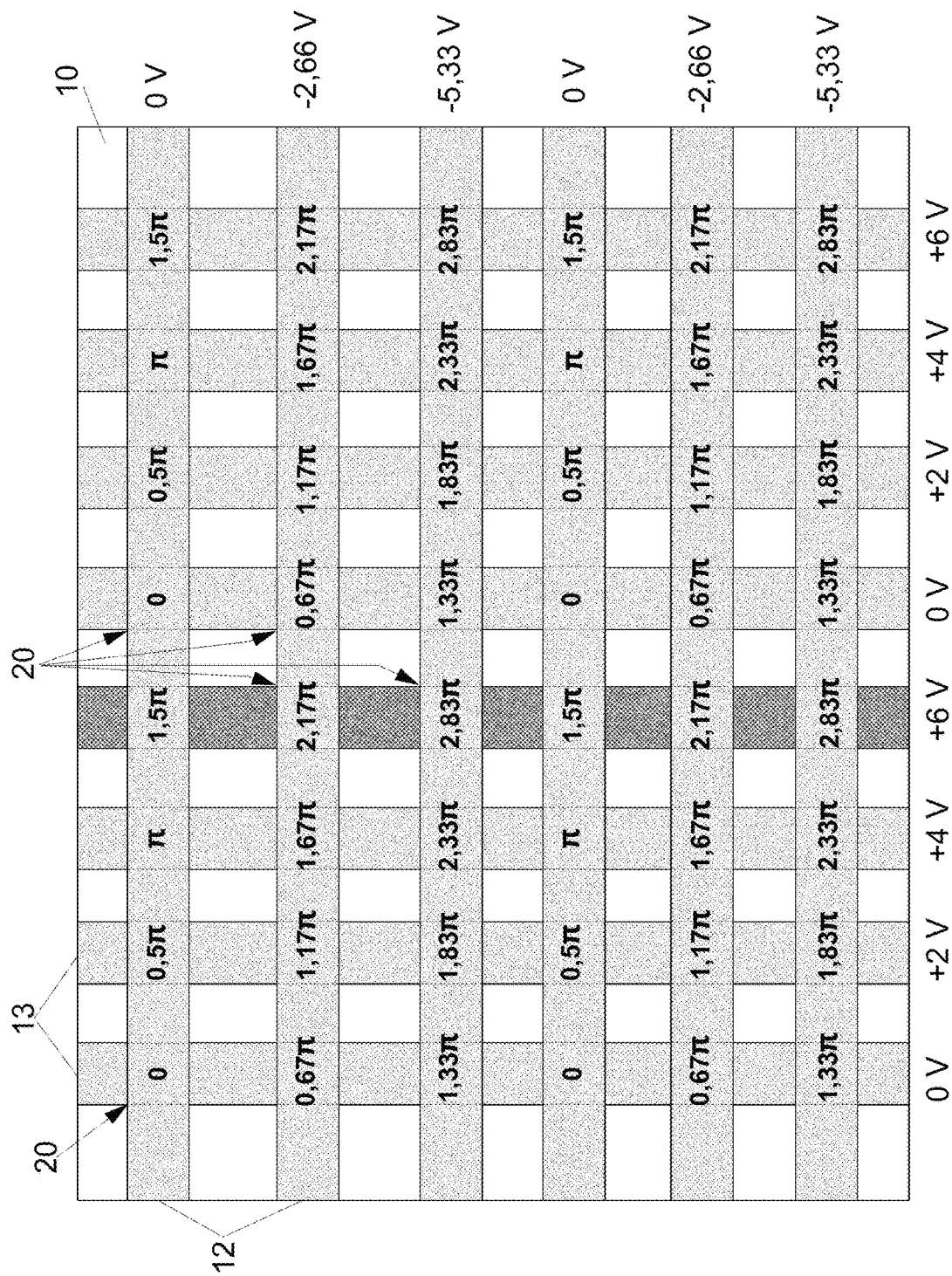
FIG. 7: a top view of a schematic diagram of the diffractive optical element according to FIG. 6 for explanation of the electrical field generated.

FIG. 7 shows an example of application of a suitable voltage to the electrodes 12 and 13 of the two substrates 10 and 11 of the diffractive optical element according to FIGS. 5 and 6. The diffractive optical element is shown therein in a top view of the first substrate 10, and only the electrode arrangement is to be considered.

Voltages are applied here in a periodically repeating manner to the electrodes 12 of the first substrate 10 of 0 volts (0 V), −2.66 volts (−2.66 V) and −5.33 volts (−5.33 V), while voltages of 0 volts (0V), 2 volts (2 V), 4 volts (4 V) and 6 volts (6 V) with opposite sign are applied to the electrodes 13 of the second substrate 11. For example, in an overlap area or area of intersection 20 between an electrode 13 with an applied voltage of 6 volts on the second substrate 11 and an electrode 12 with an applied voltage of −5.33 volts on the first substrate 10, an overall voltage of 6 V+5.33 V=11.33 volts is thus applied. As a result, assuming a linear relationship between the voltage applied to the electrodes 12 and 13 and the phase of the light, and provided that the liquid-crystal layer 14 is capable also of modulating phases of more than $2\pi$, phase modulation of the light of $2.83\pi$ is performed in the overlap area 20 of these electrodes 12 and 13. In this exemplary embodiment according to FIG. 7, phase values having a phase differential of $0.5\pi$ result in the respective overlap area 20 of the individual electrodes 12 and 13 here, viewed in horizontal direction from one electrode 12 to the next or adjacent electrode 12, and a phase differential of $0.67\pi$ viewed in vertical direction from one electrode 13 to the next or adjacent electrode 13. Preferably, a phase modulation of greater than $4\pi$ is to be achievable. A grating period of the diffraction grating may be varied and defined by the voltage values used in a different manner, which are applied to the individual adjacent electrodes, such that a defined period is determined. In the case of simultaneous generation of two diffraction gratings in the diffractive optical element, the distribution of flux lines of the electrical out-of-plane field generated between the electrodes 12 of the first substrate 10 and the electrodes 13 of the second substrate 11 in the liquid-crystal layer 14 for generation of the first diffraction grating and the distribution of flux lines for generation of the second diffraction grating are different. Moreover, in adjacent overlap areas 20 that are created by crossed electrodes 12 and 13, there are different electrical out-of-plane fields, but these repeat periodically in accordance with the voltage values applied periodically.

As a result, it is now possible to use just a single optical element, in a similar manner to a combination of two diffraction devices according to prior art, to deflect incident light both in a first direction, for example in vertical direction, and in a second direction, for example in horizontal direction. In the case of use of an ECB mode or a VA mode, the light incident on the diffractive optical element should have linear polarization in order that corresponding phase modulation of the light can be performed.

The sign of the voltages applied to the electrodes of the two substrates of the diffractive optical element may also be exchanged, such that positive voltages are applied to the first substrate and negative voltages to the second substrate.

Should it be required that the incident light must be deflected only in one direction by means of the diffractive optical element, it is then also possible to generate just one diffraction grating with a defined grating period in the diffractive optical element, by means of which the light is then correspondingly deflected in a required direction. For this purpose, the electrodes of a substrate are then all be stressed by the same voltage, while voltages with different, periodically repeating voltage values are each applied to the electrodes of the other substrate of the diffractive optical element, such that there is an out-of-plane field between the electrodes of the two substrates and the liquid-crystal molecules in the liquid-crystal layer perform corresponding out-of-plane rotation. As a result, a diffraction grating with a defined grating period is written into the diffractive optical element or generated, and the light can be deflected in a defined direction.

The exemplary embodiment of a diffractive optical element shown and described in FIG. 7 is applicable to liquid-crystal modes in which the alignment of the liquid-crystal molecules depends solely on the magnitude of a voltage applied to the electrodes of the two substrates.

Furthermore, it is also possible to apply the diffractive optical element according to the invention to liquid-crystal modes in the liquid-crystal layer, the phase modulation of the light of which depends on the sign of the voltage applied to the electrodes of the two substrates.

For liquid-crystal modes having in-plane rotation of the optical axis of the liquid-crystal molecules in the electrical out-of-plane field, phase modulation for light, which in this case should be circular-polarized light, in single pass through a liquid-crystal layer is proportional to twice the angle of rotation of the liquid-crystal molecules. In the case of passage of the light twice through a liquid-crystal layer in a diffractive optical element in reflective form, the phase modulation, given suitable configuration, i.e. given an optical thickness of the liquid-crystal layer corresponding to a half-wave layer, in conjunction with an additional retardation layer which is arranged between the liquid-crystal layer and a mirror and corresponds to a quarter-wave layer, through which the light passes between the first and second pass through the liquid-crystal layer, may be proportional to four times the angle of rotation of the optical axis of the liquid-crystal molecules. In the case of rotation of the optical axis of the liquid-crystal molecules by up to ±90 degrees, the result for a diffractive optical element in reflective form may thus be a phase modulation range of $4\pi$ (between $-2\pi$ for an angle of rotation of $-90$ degrees and $+2\pi$ for an angle of rotation of $+90$ degrees).

Here too, a comparison is again to be made between the prior art and a diffractive optical element according to the invention, and again only the electrode arrangements of the elements are to be considered for the comparison.

Figure 8:
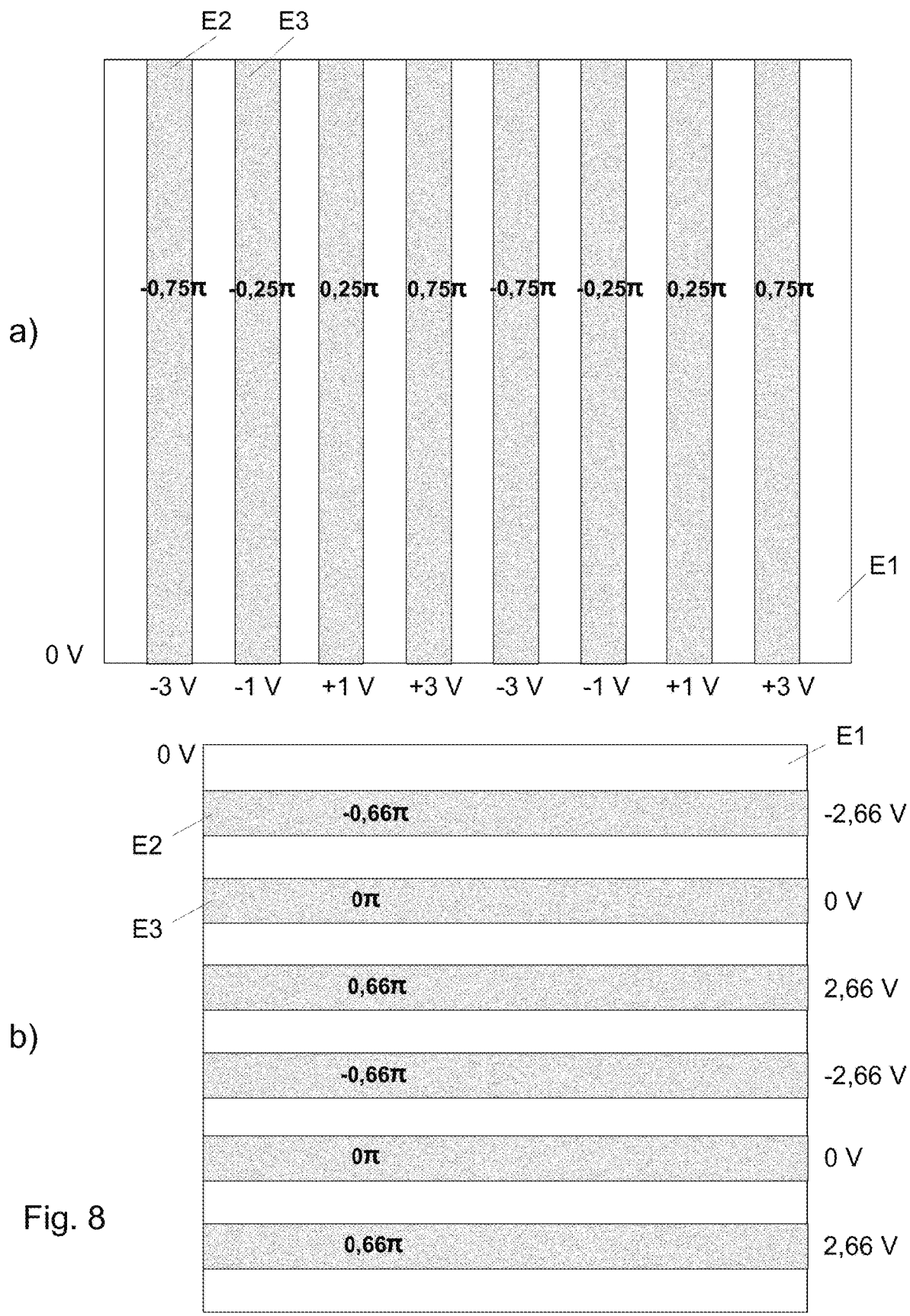
FIG. 8: a diagram showing the principle of a diffraction device according to prior art that uses a liquid-crystal mode, the phase modulation of which is dependent on the sign of the voltage applied, in top view.

FIG. 8 shows, in each of diagrams a) and b), a diffraction device according to prior art that generates phase modulation of the light by means of a sign-dependent in-plane rotation of the optical axes of liquid-crystal molecules. Diagram a) of FIG. 8 shows a diffraction device in a top view that comprises two substrates (not shown here), between which a liquid-crystal layer (likewise not shown) is embedded. One substrate of the two substrates comprises strip-shaped electrodes E2, E3, ..., $E_N$ in vertical arrangement, while another substrate comprises a planar electrode E1. The planar electrode E1 is to be represented, as in FIG. 4, by the white area. A voltage of 0 volts (0 V) is applied to the planar electrode E1. In order to generate a phase modulation of less than $0\pi$, negative voltages are applied to the strip-shaped electrodes E2, E3, ..., $E_N$, and a phase modulation of greater than $0\pi$ is generated by applying positive voltages to the strip-shaped electrodes E2, E3, ..., $E_N$. As apparent from diagram a), a voltage of 0 volts is applied to the planar electrode E1, and periodically repeating voltages of $-3$ volts ($-3$V), $-1$ volt ($-1$V), 1 volt (1V), 3 volts (3V) are applied to the strip-shaped electrodes E2, E3, ..., $E_N$. Here too, an out-of-plane field is generated in the liquid-crystal layer, but the optical axes of the liquid-crystal molecules are correspondingly aligned in-plane. In the case of a ULH mode, for example, there is a helical arrangement of liquid-crystal molecules in a cholesteric phase. An out-of-plane field deforms this helix. The deformation of the helix corresponds to a rotation of the optical axis of the liquid-crystal molecule. In this case, the optical axis of the liquid-crystal molecules thus does not correspond to the orientation of the individual liquid-crystal molecules, but results from averaging of the orientation of many liquid-crystal molecules.

Smectic liquid crystal molecules have spontaneous polarization, for example, which leads to alignment in the electrical field. Owing to the relative orientation of the polarization to the molecular axis, the effect of alignment of the polarization parallel to the electrical field is that the optical axes of liquid-crystal molecules rotate perpendicular to the electrical field. Thus, the optical axis also rotates in a plane perpendicular to the field direction, and hence in-plane when an out-of-plane field is applied.

In this way, a diffraction grating with a grating period of 4 is achieved with the phase levels of $-0.75\pi$, $-0.25\pi$, $0.25\pi$ and $0.75\pi$ in the diffraction device.

The diffraction device according to diagram a) then deflects incident light in horizontal direction.

The diagram (b) of FIG. 8 shows a diffraction device which, in terms of its construction, corresponds to the diffraction device of diagram a), but comprises strip-shaped electrodes E2, E3, ..., $E_N$ provided vertically on one of the two substrates. Again, a voltage value of 0 volts (0 V) is applied to the planar electrode E1, and voltage values of $-2.66$ volts ($-2.66$ V), 0 volts (0 V) and $+2.66$ volts ($+2.66$ V) are then applied to the strip-shaped electrodes E2, E3, ..., $E_N$. An out-of-plane field is generated between the electrodes E1 and E2, E3, ..., $E_N$, such that phase levels of $-0.66\pi$, $0\pi$ and $+0.66\pi$ are achieved by in-plane rotation of the optical axes of the liquid-crystal molecules. In this way, a diffraction grating having a grating period of 3 is achieved in the diffraction device.

The diffraction device according to diagram b) then deflects incident light in vertical direction.

Figure 9:
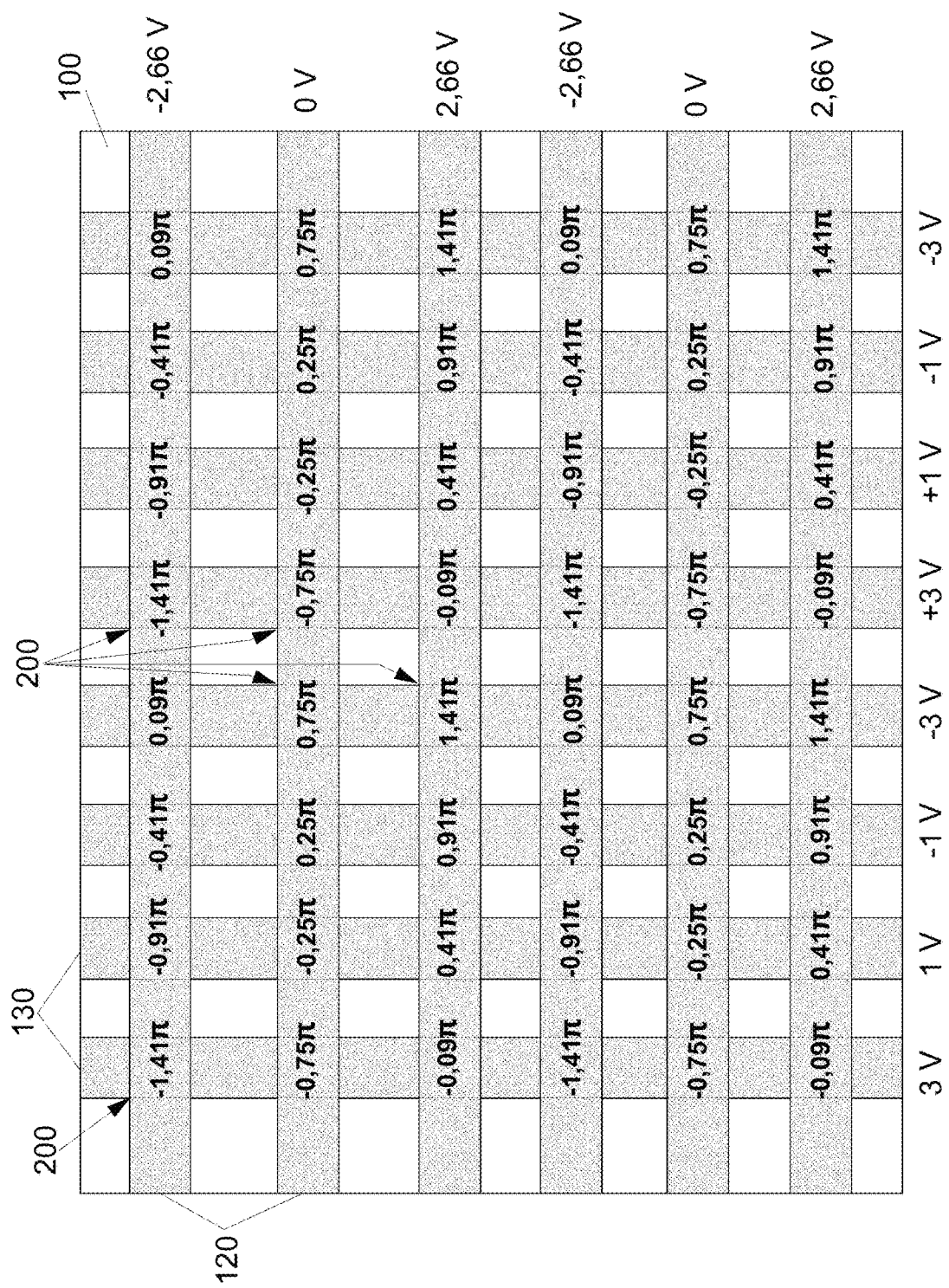
FIG. 9: a diagram showing the principle of a diffractive optical element according to the invention with use of a voltage sign-dependent liquid-crystal mode.

FIG. 9 shows a diffractive optical element according to the invention that uses a liquid-crystal mode, for example a ULH mode, the phase modulation of light of which is dependent on the sign of the voltage applied to electrodes and in which liquid-crystal molecules rotate or become aligned in-plane in the out-of-plane field generated in the liquid-crystal layer. As already mentioned for FIG. 7, for the sake of clarity, only the electrode arrangement is shown here too.

The diffractive optical element according to FIG. 9, also shown here in top view, again comprises a first substrate and a second substrate, between which a liquid-crystal layer having liquid-crystal molecules is provided. However, FIG. 9 shows only a first substrate 100 having electrodes 120 in strip or linear form that are vertical here. An invisible second substrate likewise comprises electrodes 130 in strip or linear form. The electrodes 120, like the electrodes 130, are each arranged parallel to one another on their intended substrates. In addition, the electrodes 130 of the second substrate are arranged here at an angle of 90° relative to the electrodes 120 of the first substrate 100, meaning that the electrodes 120 and 130 are arranged in a crossed manner relative to one another on their corresponding substrates. Even in the case of such a diffractive optical element, there is no requirement for the electrodes 120 and 130 to be arranged at an angle of exactly 90° to one another; instead, the electrodes 120 and 130 may also be arranged at an angle within an angle range from about 50° to about 90° to one another.

For generation of two diffraction gratings each having a variable defined grating period, by means of a control device (not shown), a voltage is then applied to the individual electrodes 120 and 130. As apparent in FIG. 9, voltages of −2.66 volts (−2.66 V), 0 volts (0 V) and +2.66 volts (+2.66 V) are applied to the electrodes 120 of the first substrate 100, while voltages of +3 volts (3 V), +1 volt (1 V), −1 volt (−1 V) and −3 volts (−3 V) are applied to the electrodes 130 of the second substrate. The voltage values applied for the electrodes 120 and 130 each repeat periodically. For example, for the upper left-hand overlap area or point of intersection 200 of two electrodes 120 and 130 on the first substrate 100 shown, shown in FIG. 9, a voltage of −2.66 volts is applied, while there is a voltage of +3 volts across the second substrate (not shown). The potential difference ΔU between these two electrodes 120 and 130 in the overlap area 200 is then, according to formula: voltage value of first substrate electrode U2−(minus) voltage value of second substrate electrode U1 (−2.66 V−3 V)=−5.66 V. There is thus a potential difference ΔU=−5.66 V in this overlap area 200. Consequently, for this negative voltage applied to the electrodes 120 and 130 of the diffractive optical element in this overlap 200 area in the liquid-crystal layer, there is phase modulation of the light of −1.41π. These voltages applied to the electrodes 120 and 130 of the two substrates that are apparent in FIG. 9 generate two diffraction gratings having a defined grating period by the generation of an out-of-plane field in the liquid layer and the resultant corresponding alignment or orientation through in-plane rotation of the optical axes of the liquid-crystal molecules. This results in the phase values shown, for example of −1.41π, −0.91π or else −0.75π, −0.25π, for a phase modulation of incident light in the corresponding overlap areas 200 of the electrodes 120 and 130. As additionally apparent in FIG. 9, viewed in horizontal direction, there is a phase difference of 0.5π in each case, and, viewed in vertical direction, a phase difference of 0.67π (modulo 2π) between any two adjacent electrodes 120 or 130.

The diffractive optical element may thus deflect light incident in this way, preferably circular-polarized light, in one direction, horizontal here, or in another direction, vertical here. For this purpose, it is possible to simultaneously generate two diffraction gratings having a defined grating period in the diffractive optical element. However, it is also possible here that just one diffraction grating having a defined grating period is generated in the diffractive optical element if this should be required in desired cases. The diffraction grating is then generated by electrodes on just one of the two substrates, such that different, periodically repeating voltages are applied to these electrodes, and a voltage equal for all electrodes to the electrodes of the other substrate. Thus, an out-of-plane field is likewise generated, but only one diffraction grating is written into the diffractive optical element. Here too, phase modulation of the light of ≥2π, preferably of ≥4π, is provided.

If the maximum phase modulation of the liquid-crystal layer is, for example, smaller than 4π, since, in general terms, the maximum angle of rotation of the optical axis in the case of in-plane rotation of the optical axis of the liquid-crystal molecule is less than 90 degrees, it would result under some circumstances in slight restrictions in the diffraction efficiency of the diffractive optical element. Configurations of the diffractive optical element with a smaller modulation range of the phase of light nevertheless permit required deflection of light in two different directions.

In general, preference is given to utilizing a range of phase modulation in the liquid-crystal layer of the diffractive optical element that has approximately a linear correlation of the phase with voltage applied to the electrodes of the substrates and consequently with the out-of-plane field applied. This is to be explained with reference to FIG. 10.

Figure 10:
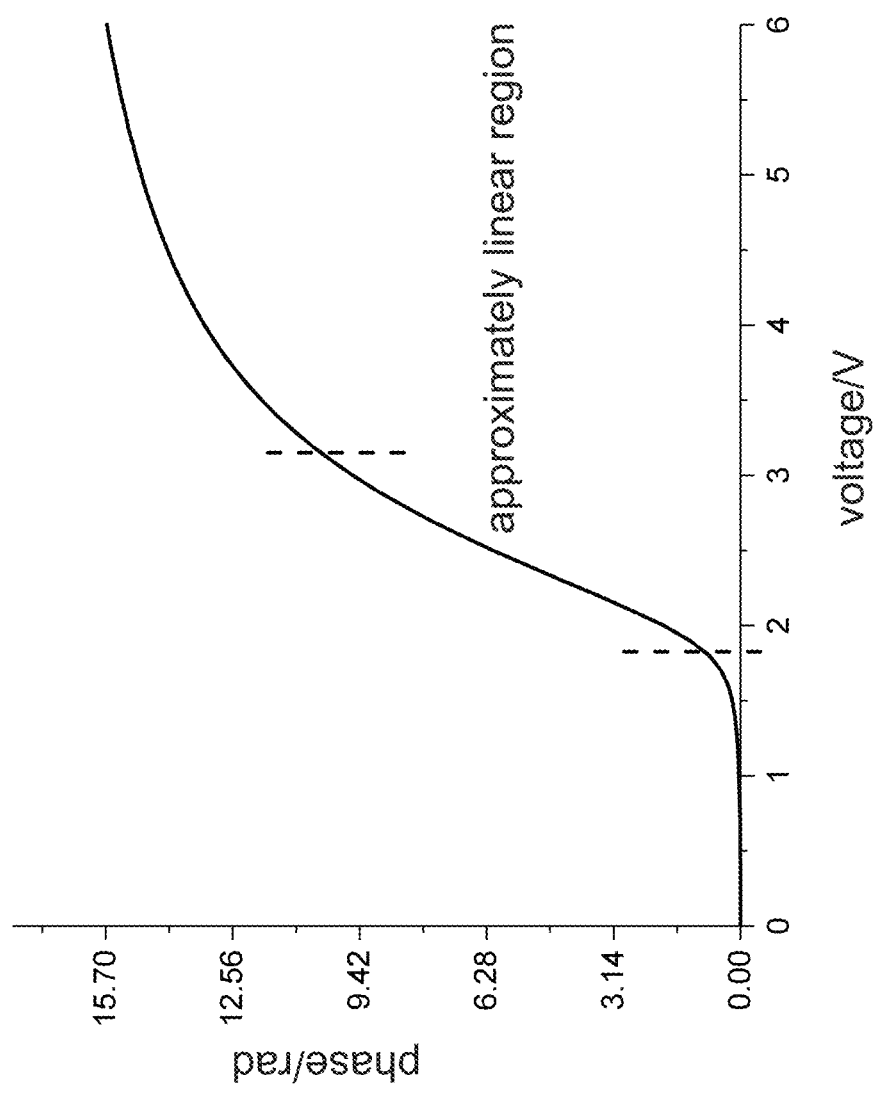
FIG. 10 a graph showing an S-shaped curve for the dependence of the phase modulation on the voltage applied to an electrode arrangement with use of an ECB mode in a liquid-crystal layer.

For an ECB mode used in a liquid-crystal layer, the result is frequently an approximately S-shaped curve for the dependence of the phase modulation of the voltage applied to an electrode arrangement of the diffractive optical element, as shown by FIG. 10. In the case of very small and also very large phase values, according to the S-shaped curve of FIG. 10, the dependence of the phase on the voltage applied differ distinctly from the desired linear behavior. For average phase values as indicated in FIG. 10 by the region bounded by dotted lines, however, the change in the phase value with the voltage applied is roughly linear. Preferably only the linear section of a curve is utilized for the dependence of the phase modulation on the voltage applied to the electrodes of the substrates. The maximum phase modulation of the light in the liquid-crystal layer is preferably chosen to be sufficiently large, e.g. ≥5π, such that the portion of the phase modulation corresponding to the range with linear behavior of the phase of the light relative to the voltage applied to the electrodes of the substrates (see region indicated by dotted lines in FIG. 10) also comprises a phase modulation range of about 4π.

The diffractive optical element may be either designed to be transmissive or reflective. In order to achieve phase modulation of ≥4π for a diffractive optical element in transmissive form, it may be necessary to adjust the thickness of the liquid-crystal layer or to design it appropriately, i.e. to provide a greater thickness than for a diffractive optical element in reflective form. What this means is that, for a diffractive optical element in reflective form, on account of the passage of the light twice through the liquid-crystal layer, this may have a thinner configuration for a phase modulation of the light of ≥4π than a diffractive optical element in transmissive form.

Since, in addition, in an out-of-plane field generated in a liquid-crystal layer, it is also possible for there to be unwanted in-plane fields between the individual electrodes on the two substrates, the regions that can generate the unwanted in-plane fields should be kept as small as possible in terms of their area. This can be assured when the strip-shaped electrodes on the two substrates are configured in such a way that the area between the individual electrodes on the individual substrates is ideally kept as small as possible. This means that only a very small gap should be present between the individual electrodes arranged parallel to one another on the individual substrate. In the customary line/space designation (line width and interspace) for finely resolved structures, therefore, the line (line width) should be at a maximum and the space (interspace) at a minimum. This is applicable taking account of the customary manufacturing tolerances. Too small a space, for example, increases the risk of short circuits between adjacent electrodes in the production of the electrode structure. In practical terms, the space would be selected to be as small as possible, but large enough for the electrode structure to be produced with good yield. A minimum pitch of the electrodes from one another is advantageous in order to achieve maximum deflection angles in a diffractive structure. In the case of a very small pitch, however, the line/space ratio would again become unfavorable if, in order to avoid short circuits, a particular distance must be maintained between the electrodes. One example would be a pitch of the electrodes of 2 micrometers with a width of the electrodes of 1.5 micrometers and an interspace to the next electrode of 0.5 micrometer. It will be appreciated that there is no intention to restrict the invention to these numerical values.

Figure 11:
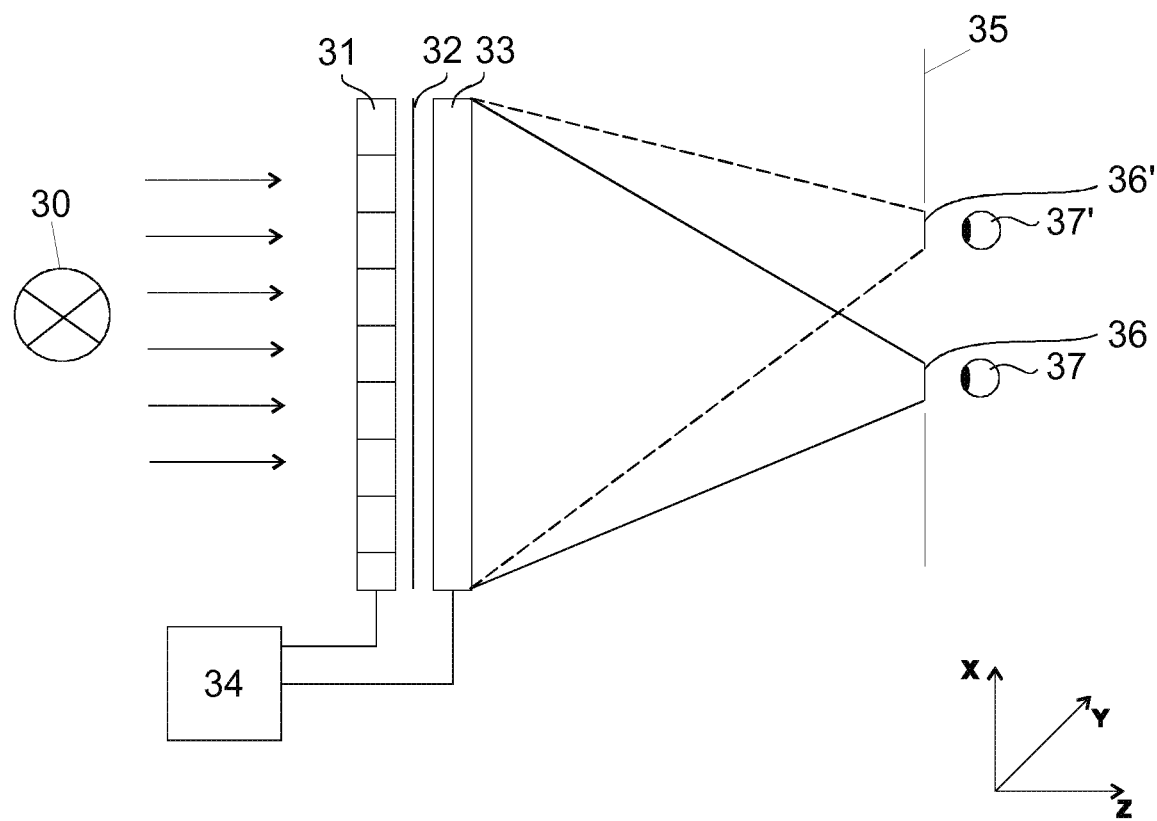
FIG. 11: a diagram showing the principle of a display device according to the invention in top view.

FIG. 11 shows a display device, especially a holographic display device, for representation of two-dimensional and/or three-dimensional information, such as objects or scenes. The display device comprises an illumination device 30 for emission of light. The illumination device here may comprise at least one light source that preferably emits polarized light, especially linear-polarized light or circular-polarized light. In addition, the display device comprises at least one spatial light modulation device 31 having pixels, which is illuminated with light from the illumination device for modulation of the amplitude and/or phase of the light in accordance with a scene or object to be represented. An optical system 32 in conjunction with the at least one spatial light modulation device 31 serves for reconstruction and representation of the preferably holographically generated scene. In the direction of light downstream of the at least one spatial light modulation device 31, a diffractive optical element 33 is provided, which may be designed as described in FIGS. 5, 6, 7 and 9. The at least one spatial light modulation device 31 and the diffractive optical element 33 are connected to a control device 34 by means of which these elements 31 and 33 may be correspondingly controlled. However, the diffractive optical element 33 could also be controlled by a dedicated control device. It is thus possible by means of the control device 34 to apply corresponding voltages to the electrodes of the diffractive optical element 33, in order to generate at least one diffraction grating with a defined grating period. Depending on the control of the electrodes of the diffractive optical element 33, this has a variable diffraction grating or a variable diffraction structure. By means of the diffraction grating present in the diffractive optical element 33, it is possible to variably diffract the light modulated by the at least one light modulation device 31 in a definable manner and to deflect it in at least one required lateral or axial direction. This diffractive optical element enables lateral tracking of at least one virtual observer window 36 generated in an observer plane 35 through which an eye 37 of an observer must look to be able to observe the scene represented. If an observer moves to a different position, it is possible by means of the diffractive optical element 33 to track the virtual observer window 36 to the new eye position now identified by reference numeral 37'. The virtual observer window at the new observer position of the observer is identified by reference numeral 36'. For this purpose, a corresponding diffraction grating having a grating period required for the purpose is written into the diffractive optical element 33 by the applying of corresponding predefined voltages on the electrodes of the substrates of the diffractive optical element 33. The diffractive optical element can thus achieve tracking of the virtual observer window 36 in just one defined lateral direction, or else simultaneously in two lateral directions defined at an angle to one another. The tracking of the virtual observer window 36 in an axial direction (z direction) is also possible by means of the diffractive optical element by writing of lens functions into the diffractive optical element. This depends on the new position of the observer relative to the spatial light modulation device 31.

The provision of such a diffractive optical element according to the invention in a display device allows it to have a more compact configuration in terms of its construction than in the case of provision of two diffraction devices for deflection of light.

It is also possible to use the diffractive optical element in other devices than in a display device for representation of preferably three-dimensional scenes or objects, since the diffractive optical element in principle enables deflection of light by diffraction. Thus, the diffractive optical element can generally be used in devices in which deflection of light is demanded or required.

The invention is not restricted to the exemplary embodiments presented here. Further combinations of the embodiments, or exemplary embodiments are also possible. Finally, it should be pointed out more particularly that the above-described exemplary embodiments serve merely for description of the teaching claimed, but there is no intention to restrict this to the exemplary embodiments.

The invention claimed is:

1. A diffractive optical element comprising:
a first substrate and a second substrate, between which a liquid-crystal layer is provided,
strip-shaped electrodes on the first substrate and strip-shaped electrodes on the second substrate, where the electrodes on the first substrate are arranged at an angle of greater than 50° relative to the electrodes on the second substrate,
the electrodes on the first substrate and the electrodes on the second substrate are controllable in such a way that a defined out-of-plane field is generatable in a respective overlap area of the electrodes on the first substrate with the electrodes on the second substrate, and
in a case of simultaneous generation of a first diffraction grating for deflection of light in a first defined direction and of a second diffraction grating for deflection of light in a second defined direction, a change in an electrical field from one electrode to a next electrode is set differently for the electrodes on the first substrate than for the electrodes on the second substrate.

2. The diffractive optical element as claimed in claim 1, wherein the diffractive optical element is designed in such a way that incident light is deflectable in at least one direction.

3. The diffractive optical element as claimed in claim 2, further comprising at least one diffraction grating with a defined grating period.

4. The diffractive optical element as claimed in claim 1, wherein a diffraction grating with a defined grating period is generatable by individual control of the electrodes on only one substrate for a deflection of light incident on the diffractive optical element in a predetermined direction.

5. The diffractive optical element as claimed in claim 1, wherein two diffraction gratings each with a defined grating period are generatable simultaneously by individual control of the electrodes on the first substrate and of the electrodes on the second substrate for a deflection of light incident on the diffractive optical element in two predetermined directions provided at an angle to one another.

6. The diffractive optical element as claimed in claim 1, wherein the electrodes on the first substrate are in an essentially horizontal arrangement and the electrodes on the second substrate are in an essentially vertical arrangement, or in that the electrodes on the first substrate are in an essentially vertical arrangement and the electrodes on the second substrate are in an essentially horizontal arrangement.

7. The diffractive optical element as claimed in claim 1, wherein the electrodes on the first substrate and the electrodes on the second substrate are each arranged at an angle to a horizontal line, where the electrodes of the first substrate are provided at an angle to the electrodes of the second substrate.

8. The diffractive optical element as claimed in claim 1, wherein different electrical out-of-plane fields that repeat periodically are provided in the adjacent overlap areas of the electrodes of the first substrate with the electrodes of the second substrate.

9. The diffractive optical element as claimed in claim 1, wherein in the case of simultaneous generation of a first diffraction grating for deflection of light in a first defined direction and of a second diffraction grating for deflection of light in a second defined direction, the distribution of flux lines of the electrical field generated between the electrodes of the first substrate and the electrodes of the second substrate in the liquid-crystal layer for generation of the first diffraction grating and the distribution of flux lines of the electrical field for generation of the second diffraction grating are different.

10. The diffractive optical element as claimed in claim 1, wherein a single diffraction grating is generated by controlling the electrodes on one substrate with equal voltage values and controlling the electrodes on the other substrate with respectively different, periodically repeating voltage values by a control device.

11. The diffractive optical element as claimed in claim 1, wherein a liquid-crystal mode is provided, with which by an out-of-plane field at least one diffraction grating with a defined grating period is generatable.

12. The diffractive optical element as claimed in claim 11, wherein the liquid-crystal mode is an ECB mode, a ULH mode or a VA mode.

13. The diffractive optical element as claimed in claim 1, wherein a phase modulation of the light in the liquid-crystal layer of >2π, preferably of >4π, is realizable.

14. The diffractive optical element as claimed in claim 13, wherein a range of phase modulation is selectable that has a linear characteristic of the phase of light depending on the voltage applied to the electrodes of at least one substrate.

15. The diffractive optical element as claimed in claim 1, wherein the diffractive optical element is designed to be transmissive or reflective.

16. The diffractive optical element as claimed in claim 15, wherein the diffractive optical element is designed to be reflective and has a liquid-crystal mode in which liquid-crystal molecules of the liquid-crystal layer undergo in-plane rotation in the out-of-plane field.

17. A display device for displaying two-dimensional and/or three-dimensional objects or scenes, comprising an illumination device, at least one spatial light modulation device and at least one diffractive optical element as claimed in claim 1.

18. The display device as claimed in claim 17, wherein the illumination device is provided for emission of polarized light.

19. The display device as claimed in claim 17, wherein at least one control device is provided for control of electrodes on a first substrate and/or of electrodes on a second substrate of the at least one diffractive optical element.

* * * * *